(12) United States Patent
Fang et al.

(10) Patent No.: US 10,071,934 B1
(45) Date of Patent: Sep. 11, 2018

(54) HIGH PERFORMANCE FIRE RESISTANT CONCRETE CONTAINING HYBRID FIBERS AND NANO PARTICLES

(71) Applicant: Nano and Advanced Materials Institute Limited, Hong Kong (HK)

(72) Inventors: Shuai Fang, Hong Kong (HK); Honggang Zhu, Hong Kong (HK); Yue Kee Lam, Hong Kong (HK); Man Lung Sham, Hong Kong (HK); Chi Sun Poon, Hong Kong (HK); Feng Li, Hong Kong (HK); Pui Lam Ng, Vilnius (LT)

(73) Assignee: Nano and Advanced Materials Institute Limited, Hong Kong (HK)

( * ) Notice: Subject to any disclaimer, the term of this patent is extended or adjusted under 35 U.S.C. 154(b) by 0 days.

(21) Appl. No.: 15/899,376

(22) Filed: Feb. 20, 2018

Related U.S. Application Data

(60) Provisional application No. 62/600,379, filed on Feb. 22, 2017.

(51) Int. Cl.

| | |
|---|---|
| C04B 18/08 | (2006.01) |
| C04B 18/14 | (2006.01) |
| C04B 14/02 | (2006.01) |
| C04B 14/48 | (2006.01) |
| C04B 20/00 | (2006.01) |
| C04B 20/10 | (2006.01) |
| C04B 24/28 | (2006.01) |
| C04B 16/06 | (2006.01) |
| C04B 111/28 | (2006.01) |

(52) U.S. Cl.
CPC ............ C04B 18/08 (2013.01); C04B 14/026 (2013.01); C04B 14/48 (2013.01); C04B 16/0625 (2013.01); C04B 18/146 (2013.01); C04B 20/0036 (2013.01); C04B 20/1062 (2013.01); C04B 24/283 (2013.01); *C04B 2111/28* (2013.01); *C04B 2201/52* (2013.01)

(58) Field of Classification Search
CPC ..... C04B 18/08; C04B 18/146; C04B 14/026; C04B 14/48; C04B 20/0036; C04B 20/1062; C04B 24/283; C04B 16/0625; C04B 2201/52; C04B 2111/28
See application file for complete search history.

(56) References Cited

U.S. PATENT DOCUMENTS

| | | | | |
|---|---|---|---|---|
| 6,488,762 B1 * | 12/2002 | Shi | ........................... | C04B 28/02 106/676 |
| 6,881,256 B2 * | 4/2005 | Orange | .................. | C04B 28/02 106/640 |
| 7,641,731 B2 * | 1/2010 | Chanut | .................... | C04B 28/02 106/644 |
| 9,115,026 B2 * | 8/2015 | Tanaka | ..................... | C04B 28/04 |
| 9,249,053 B2 * | 2/2016 | Leung | ..................... | C04B 28/02 |
| 9,365,456 B2 * | 6/2016 | Shah | ....................... | C04B 28/02 |
| 9,809,981 B2 * | 11/2017 | Ciuperca | ................. | E04F 13/02 |
| 2008/0134942 A1 * | 6/2008 | Brenner | .................. | C04B 28/04 106/672 |
| 2010/0168281 A1 * | 7/2010 | Lee | ..................... | C04B 20/0072 524/4 |
| 2014/0060388 A1 * | 3/2014 | Sadiq | ..................... | B82Y 30/00 106/644 |
| 2015/0315079 A1 * | 11/2015 | Lura | ....................... | C04B 28/02 524/5 |
| 2018/0072938 A1 * | 3/2018 | Mazyar | .................. | C09K 8/467 |

FOREIGN PATENT DOCUMENTS

| | | | | | |
|---|---|---|---|---|---|
| CN | 103896527 A | * | 7/2014 | | |
| CN | 103910510 A | * | 7/2014 | | |
| CN | 105272004 A | * | 1/2016 | | |
| CN | 106116343 A | * | 11/2016 | | |
| JP | 2012001427 A | * | 1/2012 | | |
| KR | 20150085572 A | * | 7/2015 | | |
| WO | WO-2009011480 A1 | * | 1/2009 | | |
| WO | WO-2012151657 A1 | * | 11/2012 | ......... | B28B 19/0038 |

OTHER PUBLICATIONS

Derwent-Acc-No. 2016-72036S, abstract of Chinese Patent Specification No. CN 106082874 A (Nov. 2016).*

* cited by examiner

*Primary Examiner* — Anthony J Green
(74) *Attorney, Agent, or Firm* — Idea Intellectual Limited; Margaret A. Burke; Sam T. Yip

(57) ABSTRACT

A high-workability, fire-resistant, anti-spalling concrete composition is provided. The concrete composition has a slump value of at least approximately 150 mm, a fire-resistant period of at least 4 hours, a compressive strength of at least 120 MPa at room temperature, and a compressive strength of at least 20 MPa at 700° C. The composition includes cement, fly ash, silica fume, aggregate particles having a particle size $D_{90}$ of approximately 20 mm or less and superplasticizer. The composition includes fiber additives including steel fibers in an amount ranging between approximately 0.1% and approximately 0.4% by volume of the concrete composition and polypropylene fibers having a melting point of approximately 200° C. or less in an amount ranging between approximately 0.05% and 0.3% by volume of the concrete composition. Carbon nanotubes are also present in an amount ranging between approximately 0.1% and approximately 0.3% by volume of the concrete composition.

11 Claims, 21 Drawing Sheets

(b) Right view (a) Left view

HIGH PERFORMANCE FIRE RESISTANT CONCRETE CONTAINING HYBRID FIBERS AND NANO PARTICLES

CROSS-REFERENCE TO RELATED APPLICATIONS

The present application claims priority from the U.S. provisional patent application Ser. No. 62/600,379 filed Feb. 22, 2017, and the disclosure of which is incorporated by references in its entirety.

FIELD OF THE INVENTION

The invention relates to high performance concrete compositions and, more particularly, to high performance concrete compositions with fibers and nanoparticles.

BACKGROUND

High performance concrete (HPC) is a high-strength, high-durability concrete used in roadway, bridge, tunnel, and high-rise construction. Typically, HPC features high compressive strength, high modulus of elasticity, chemical resistance, and compaction without segregation. However, the inferior fire resistance of HPC is a major factor hindering its widespread adoption in buildings. Fibers may be used in an effort to improve the fire resistance of HPC, but the introduction of fibers has been demonstrated to substantially reduce the workability of the concrete. In applications where concrete must be pumped to high levels, loss of workability precludes the use of such fiber-containing concrete. Thus, there is a need in the art for high performance concrete compositions that possess high workability in addition to being fire resistant.

SUMMARY OF THE INVENTION

The present invention relates to high performance concrete compositions that are both fire-resistant and possess high workability. In one aspect, the present invention provides a high-workability, fire-resistant, anti-spalling concrete composition having a slump value of at least approximately 150 mm, a fire-resistant period of at least 4 hours, a compressive strength of at least 120 MPa at room temperature and 20 MPa at 700° C. The composition includes cement, fly ash, silica fume, aggregate particles having a particle size $D_{90}$ of approximately 20 mm or less and superplasticizer. The composition includes fiber including steel fibers in an amount ranging between approximately 0.1% and approximately 0.4% by volume of the concrete composition and polypropylene fibers having a melting point of approximately 200° C. or less in an amount ranging between approximately 0.05% and 0.3% by volume of the concrete composition. Carbon nanotubes are also present in an amount ranging between approximately 0.1% and approximately 0.3% by volume of the concrete composition.

DETAILED DESCRIPTION

Figure 1:
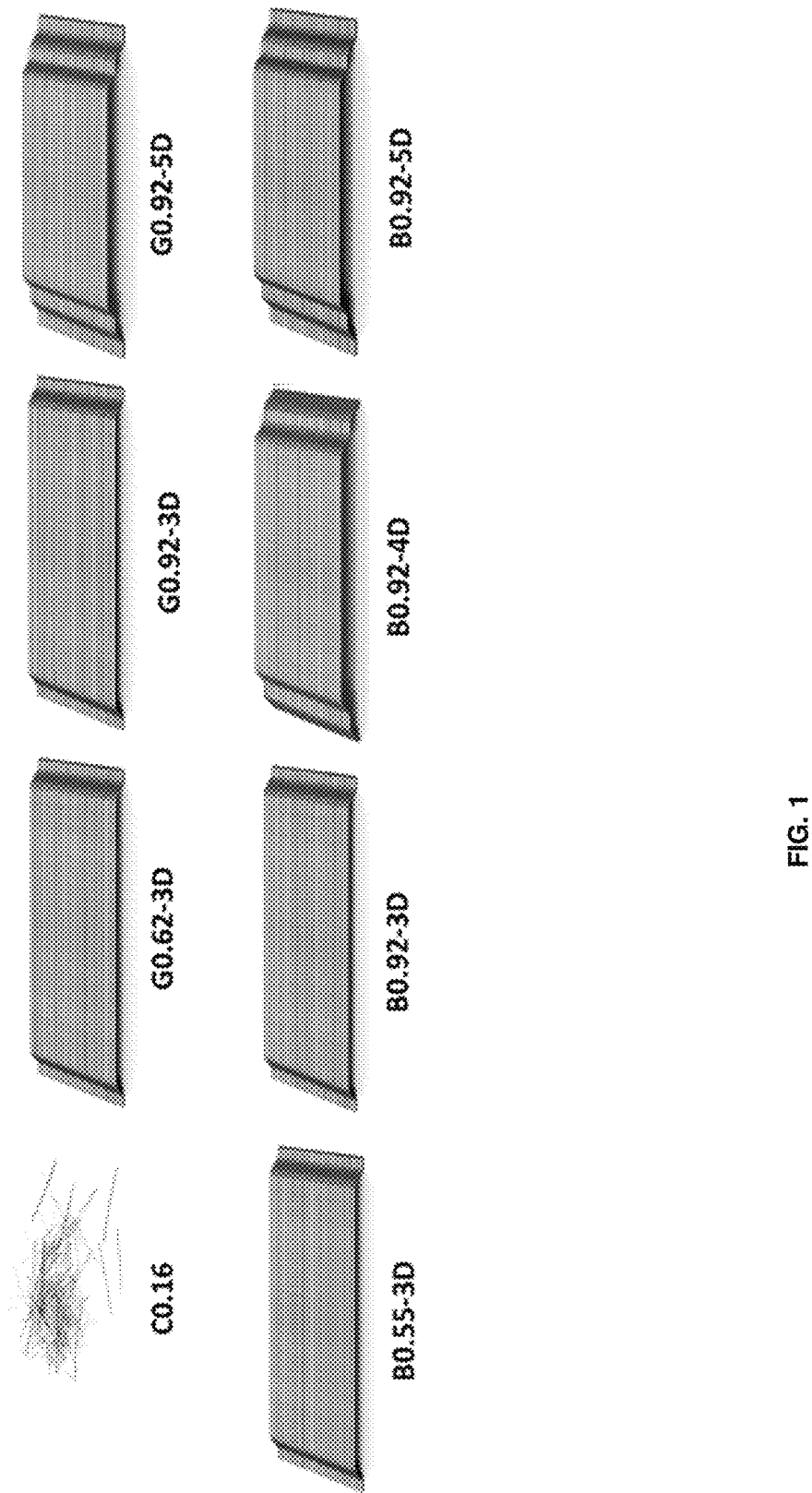
FIG. 1 depicts steel fibers for use in HPC.

As discussed in the Background section above, fibers and other additives to high performance concrete may reduce workability of concrete. "Concrete slump" is a measure of concrete workability. Concrete slump measures the consistency of fresh concrete before it sets by forming it into a cone shape and measuring the cone subsidence, an indication of the ease with which concrete flows. As the HPC of the present invention will contain multiple fibers and have a strength ranging from grade C80 to C100 and slump above 150 mm, concrete formulations without fibers were developed having an objective slump of 180 mm.

TABLE 1

Formulations of concrete without fibers (kg/m3)

| Formulation ID | WF1 | WF2 | WF3 | WF4 | WF5 | WF6 | WF7 |
| --- | --- | --- | --- | --- | --- | --- | --- |
| Water | 165 | 155 | 145 | 156 | 165 | 147 | 130 |
| Cement | 460 | 467 | 475 | 440 | 383 | 382 | 380 |
| Fly ash | 166 | 170 | 177 | 120 | 137 | 141 | 145 |
| Silica fume | 60 | 68 | 75 | 40 | 28 | 43 | 58 |
| Coarse aggregate (20 mm) | — | — | — | 580 | 590 | 595 | 600 |
| Coarse aggregate (10 mm) | 930 | 925 | 918 | 320 | 330 | 365 | 400 |
| Fine aggregate | 619 | 615 | 610 | 700 | 720 | 680 | 640 |
| Superplasticizer | 10.6 | 12.5 | 14.6 | 17.0 | 7.6 | 10.5 | 19.0 |
| Water binder ratio | 0.24 | 0.22 | 0.199 | 0.26 | 0.301 | 0.260 | 0.223 |

Ordinary Portland cement, fly ash, silica fume, coarse aggregates (10 mm and 20 mm, granite), fine aggregates (stone fines and/or natural river sand), superplasticizer and water were employed for concrete preparation. "Superplasticizer" as used herein, refers to materials used to disperse cement agglomerates. Superplasticizers may be polycarboxylate-based polymers such as polycarboxylate ether-based polymers. A commercial polycarboxylate-based plasticizer, ADVA 189, from GCP Applied Technologies is used. As shown in Table 1, seven formulations of concrete were tried. The slump of fresh concrete was measured with a slump cone, following the relevant standards. Six cubic specimens of 100 mm×100 mm×100 mm were cast for each formulation to measure the 7-day and 28-day compressive strength. All the specimens were removed from moulds one day after casting, and were then wet-cured. Compression tests were carried out at the age of 7 days and 28 days, respectively with a loading rate employed of 0.6 MPa/s according to BS EN 12390-3. The compressive strength was the average of results of three specimens.

According to revelant Hong Kong code, the below formulation was used to define the strength grade of concrete:

$$f_{cu} \geq f_{cu,k} + 1.645\sigma$$

Where $f_{cu}$ is the measured 28 days compressive strength of concrete, $f_{cu,k}$ is the strength grade of concrete, while $\sigma$ is the specified standard deviation of measured compressive strength, i.e. 8 MPa. Following the formulation, for example, the 28 day compressive strengths of Grade C80, C90 and C100 concrete should be not below 93 MPa, 103 MPa and 113 MPa, respectively.

TABLE 2

Slump and compressive strength of concrete formulations without fiber

| Formulation | | WF1 | WF2 | WF3 | WF4 | WF5 | WF6 | WF7 |
|---|---|---|---|---|---|---|---|---|
| Slump (mm) | | 210 | 200 | 210 | 200 | 180 | 180 | 180 |
| Compressive strength (MPa) | 7 days | 78.4 | 85 | 88.3 | 79.2 | 78 | 85.2 | 99.7 |
| | 28 days | 100.9 | 107.8 | 115.2 | 95.4 | 99.5 | 110.4 | 120 |

The slump and compressive strength of concrete formulations without fiber are shown in Table 2. It can be seen that all the formulations showed an excellent workability, i.e. slump not below 180 mm. The strength of WF1, WF4 and WF5 reaches grade C80, the strength of WF2 and WF6 reaches grade C90, while the strength of WF3 and WF7 reaches grade 100. However, regarding formulations WF1, WF2, WF3 and WF4, their total cementitious material contents (cement, fly ash and silica fume) are relatively high and even higher than the upper limit (maximum 600 kg/m³) specified in Hong Kong code. As the high cementitious material content may induce large hydration heat and shrinkage leading to cracks in concrete elements, formulations WF1 to WF4 may not lead to practical applications. Formulations WF5, WF6 and WF7, as grades C80, C90 and C100 concrete respectively, were selected for use with fiber and other additives.

To develop a fire-resistant HPC composition with high workability, the effects of various additives were evaluated. Polymer fibers can enhance the fire resistance of concrete. Polymer fibers with a relatively low melting point may delay the temperature increase of concrete due to their endothermic effect as they melt and decompose. In addition, they enhance fire resistance by providing a path inside the concrete structure for moisture evaporation. Such moisture evaporation pathways may prevent concrete from spalling caused by vapor build-up in the structure. However, addition of polymer fibers has adverse effects on the workability of the resultant concrete, making in unsuitable for applications where the concrete needs to be pumped, as in high-rise building construction.

In order to minimize the adverse effect of polymeric fiber additions, the present invention enhances dispersion of polymeric fibers in the concrete composition. In addition to improving the workability of the concrete, fire resistance may be enhanced, that is, fire resistance is obtained with a smaller quantity of fibers. The present invention determined the dispersibility of polymer fibers depends on their surface properties, particularly water contact angle and surface energy. Therefore, various fiber surface treatments were examined to select the fibers with the highest dispersibility in the concrete composition.

Several commercial fibers were studied in the present invention to measure the water contact angle and the surface energy. The selection criteria are: the smaller the contact angle and the larger the surface energy, the better the compatibility between the fibers and concrete. Because polypropylene fibers have a melting temperature less than 200° C., they can enhance the anti-spalling properties of concrete exposed to fire. The fiber source and properties are listed in Table 3 while the water contact angle and surface energy of the fibers are listed in Table 4.

TABLE 3

Properties of Polypropylene Fibers

| Brand name | Chenqi | Yonggu | Sika fibermesh 150-12 mm | Sika fibermesh 150-6 mm | Grace | Tianyi |
|---|---|---|---|---|---|---|
| ID | F1 | F2 | F3 | F4 | F5 | F6 |
| Type | Mono-filament | Mono-filament | Mono-filament | Mono-filament | Fibrillated | Fibrillated |
| Surface treatment | No | Yes | Yes | Yes | Yes | Yes |
| Length (mm) | 19 | 12 | 12 | 6 | 16 | 12 |
| Diameter (um) | 31 | 30 | 31 | 31 | 42 | 42 |
| Cross section | Hollow circle | Y shape | Triangle | Triangle | Rectangle | — |
| Density (kg/m³) | | | 910 | | | |
| Tensile strength (MPa) | 460 | 592 | 330 | 330 | — | 604 |
| Elastic modulus (MPa) | 3850 | 4479 | 3500 | 3500 | — | 4600 |
| Melting point (° C.) | 160 | 163 | 162 | 162 | — | 160 |

TABLE 4

Measured water contact angle and surface energy of treated and commercial fibers

| Fiber | F3 (Sika) | F2 (Yonggu) | NaOH—S3 treated F1 fiber | F5 (Grace) | NaOH—S2 treated F1 fiber | F1 bare fiber (Chengqi) |
|---|---|---|---|---|---|---|
| Water contact angle (Degree) | 82.2 | 88.4 | 93 | 93.2 | 96.9 | 101 |
| Fiber | F1 bare fiber (Chengqi) | NaOH—S2 treated F1 fiber | F2 (Yonggu) | F3 (Sika) | NaOH—S3 treated F1 fiber | F5 (Grace) |
| Surface energy (mN/m) | 54.6 | 46.3 | 30.6 | 29.6 | 29 | 18.5 |

According to the results shown in Table 4, the untreated F1 fibers had the largest water contact angle, while the remaining fibers were all lower that F1. This indicates that surface treatments effectively reduce the water contact angle of polypropylene fibers. F3 (Sika) and F2 (Yonggu) fibers show relatively lower water contact angles (82.20 and 88.40, hydrophilic) amongst six types of polypropylene fibers.

Typically, one way to enhance wetting is increasing the surface energy of the material through surface treatment. However, the results in Table 4 show that all the surface treatments reduce the water contact angle but reduce the surface energy of the polypropylene fibers. Therefore, the compatibility between polypropylene fibers and concrete was evaluated according to the measured water contact angle; F3 (Sika) and F2 (Yonggu) fibers were determined to have the highest compatibility with concrete.

In addition to polypropylene fibers, the addition of steel fibers may enhance the fire resistance of high performance concrete. In particular, steel fibers can protect concrete from spalling when exposed to fire by controlling the cracks caused by differential expansion of concrete as it is heated. To reduce corrosion, galvanized and copper-coated steel fibers are used. Since the bonding between steel fibers and concrete is important for controlling crack formation and propagation, research needs to be conducted to evaluate if zinc/copper coatings degrade the bonding between steel fibers and concrete.

In order to study the effects of coatings on the bonding between steel fibers and concrete, pull-out tests were conducted to measure the bonding strength of steel fiber within concrete.

TABLE 5

Properties of steel fibers

| Steel fiber type | ID | Geometry | L mm | D mm | L/D ratio | Tensile strength (MPa) | Elastic Modulus (GPa) |
|---|---|---|---|---|---|---|---|
| Copper coated | C0.16 | (straight) | 13 | 0.16 | 81.25 | 2000 | 210 |
| Galvanized | G0.62-3D | (hooked) | 30 | 0.62 | 45 | 1440 | |
| | G0.92-3D | (hooked) | 60 | 0.92 | 65 | 1240 | |
| | G0.92-5D | (hooked) | 60 | 0.92 | 65 | 2300 | |
| Bare fibers | B0.55-3D | (hooked) | 30 | 0.55 | 55 | 1345 | |
| | B0.92-3D | (hooked) | 60 | 0.92 | 65 | 1160 | |
| | B0.92-4D | (hooked) | 60 | 0.92 | 65 | 1500 | |
| | B0.92-5D | (hooked) | 60 | 0.92 | 65 | 2300 | |

As shown in Table 5, eight types of commercial steel fibers with different geometries, including one copper coated microfiber, three types of galvanized steel fiber and four types of bare steel fibers were used. End hooks of fibers can enhance pull-out resistance as a result of mechanical locking, but have no effect to the bonding strength. When measuring the bonding strength of the steel fibers, both end hooks of galvanized and bare fibers were cut, and only the middle portions with a length of 13 mm were used. Five types of steel fibers were tested for bonding strength, including C0.16 (i.e. C0.16), G0.62 (i.e. G0.62-3D), G0.92 (specimens from G0.92-3D and 5D), B0.55 (i.e. B0.55-3D) and B0.92 (specimens from B0.92-3D, 4D and 5D). Fibers with same diameter and surface treatment but different end hooks were grouped together for the pull-out test. For each group, at least 12 specimens were tested.

For the pull-out test, steel fibers were embedded in the center of a mortar block with dimensions of 9.7 mm×12.7 mm, and an embedding length of 5 mm. Mortar with 28-day compressive strength of 66 MPa was employed to prepare pull-out test specimens having the composition of Table 6. Cured samples were subjected to pulling at a load rate of 0.4 mm/minute with the bonding strength defined as the maximum load divided by circumferential fiber area.

TABLE 6

Composition of the mortar used for pull-out test specimen

| Component | Cement | Sand | Water |
|---|---|---|---|
| kg/m³ | 710 | 1208 | 307 |

Figure 2:
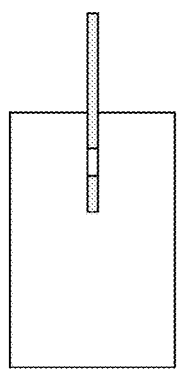
FIG. 2 depicts failure modes for steel fiber pull-out test.
Figure 2:
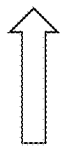
Figure 2:
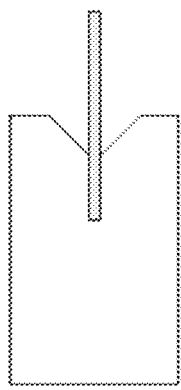
Figure 2:
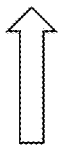
Figure 2:
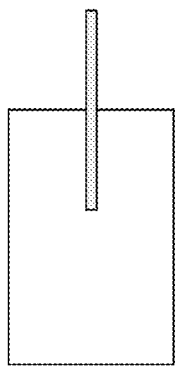

As shown in FIG. 2, there are three kinds of failure modes found for the pull out testing specimens, i.e. fiber debonding, wedge failure of the mortar, and fiber damage. Only fiber debonding was considered to be the valid failure mode for bonding strength measurement. For each group of specimens, at least 6 specimens showing debonding failure were used to obtain an average measured bonding strength.

TABLE 7

Measured bonding strength

| Sample | | B0.55 | G0.62 | B0.92 | G0.92 | C0.16 |
|---|---|---|---|---|---|---|
| Bonding strength (MPa) | Average | 1.01 | 1.34 | 3.87 | 4.46 | 6.88 |
| | Standard Deviation | 0.08 | 0.26 | 0.40 | 0.37 | 0.64 |
| | Maximum | 1.16 | 1.66 | 4.42 | 5.12 | 7.96 |
| | Minimum | 0.91 | 1.04 | 3.29 | 4.01 | 5.97 |

Figure 3:
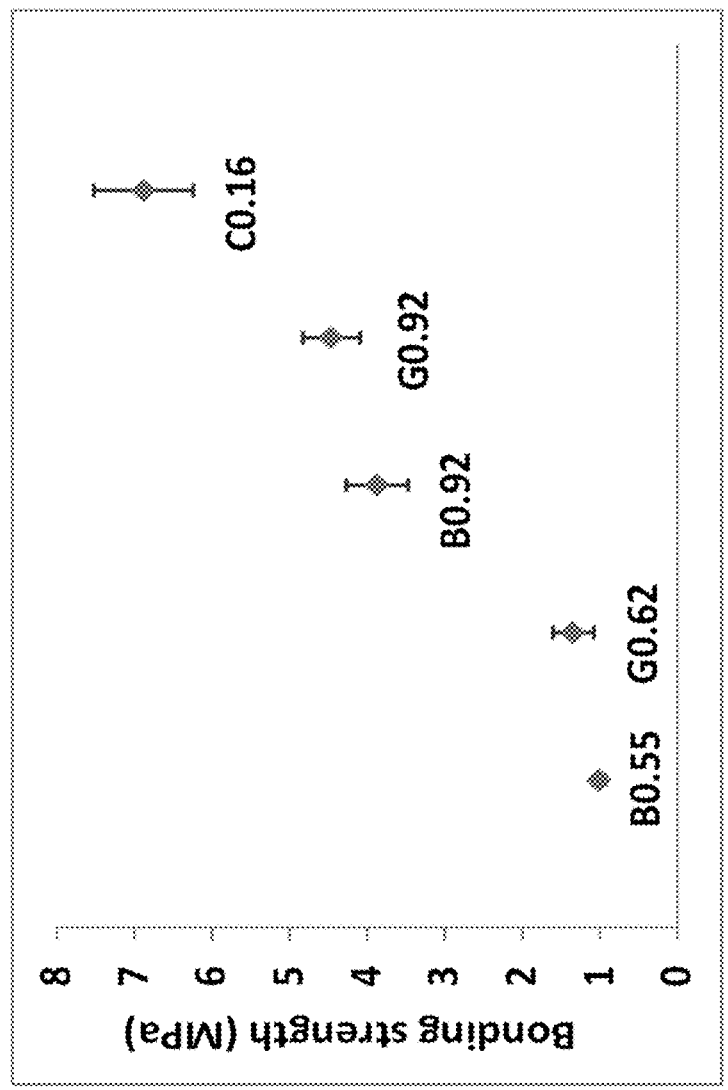
FIG. 3 is a graph depicting bonding strength of steel fibers.

Table 7 and FIG. 3 show the bonding strength of the fibers. It can be seen that, regarding bare fibers and galvanized fibers, the measured bonding strength of steel fibers increased with increasing fiber diameter. The copper coated microfiber with the smallest diameter but the highest length/diameter (L/D) ratio showed the highest bonding strength. The reason may be that increasing the L/D ratio, i.e. relatively small diameter and larger surface area, may increase the bonding strength of steel fibers. Regarding galvanized and bare fibers with similar diameter, the measured bonding strength of galvanized fibers was larger than that of bare fibers. Therefore, zinc and copper coatings increased the bonding strength of steel fibers in concrete.

Figure 4:
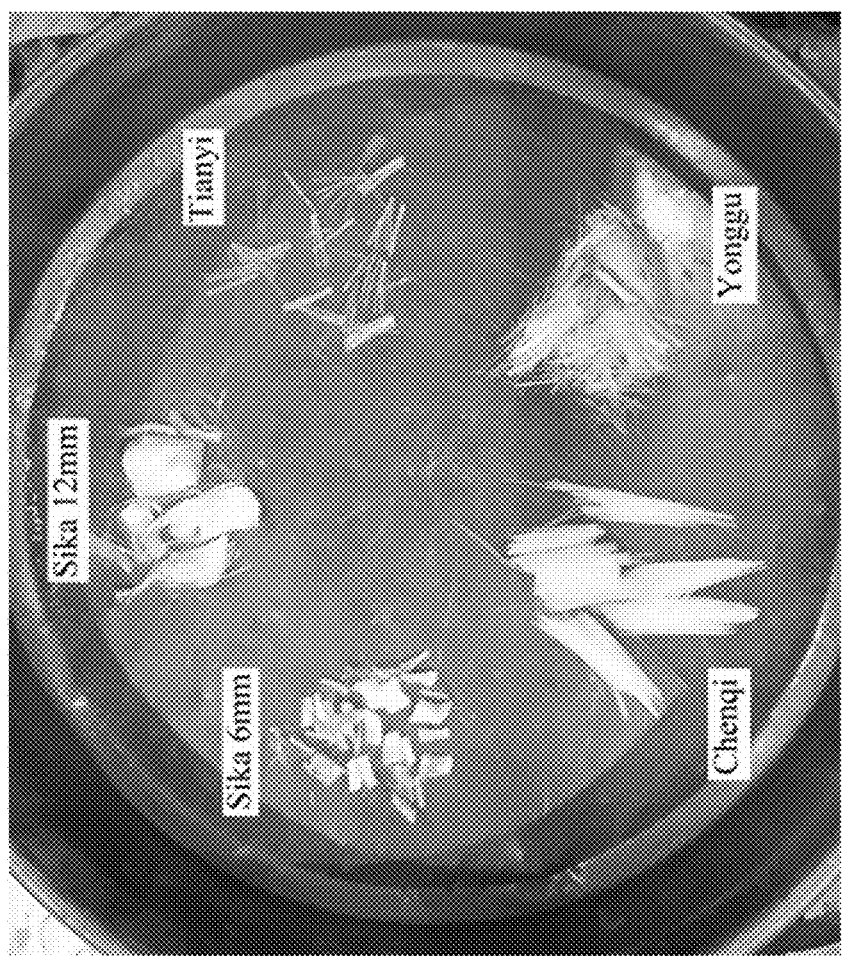
FIG. 4 is a photograph of polypropylene fibers for use in HPC.

In order to optimize the performance of concrete containing polypropylene fibers, studies were conducted in the present invention to investigate the effects of dosage, length, cross section and fibrillation of polypropylene fibers on the slump, strength and fire resistance of concrete. FIG. 4 depicts the fibers of Table 3. Fiber amounts were proposed to be in a range of 0.04-0.3 vol %. To study the effects of fiber dosage, two dosages were employed for each type of polypropylene fiber for concrete preparation, i.e. 0.165 vol % (1.5 kg/m³) and 0.3 vol % (2.73 kg/m³).

The formulation WF7 was employed as the base concrete formulation to prepare concrete containing polypropylene fibers. In total, 10 groups of specimens were prepared, i.e. F1-L, F1-H, F2-L, F2-H, F3-L, F3-H, F4-L, F4-H, F6-L and F6-H, in which F1, F2, F3, F4 and F6 indicated the fiber type, L indicated the lower dosage of 0.165 vol % and H indicated the higher dosage of 0.3 vol %. Table 8 shows the composition of concrete containing 0.165 vol % and 0.3 vol % polypropylene fibers. The slump of fresh concrete was measured with a slump cone following the relevant Hong Kong standards. Seven cubic specimens of 100 mm×100 mm×100 mm were cast for each group, in which three cubes were used for 28 days compressive strength measurement and the remaining four cubes were used for fire resistance evaluation; two were completely dried and two were cured under 50% relative humidity ("RH"). All the specimens were removed from moulds one day after casting, and specimens for compression testing were then wet-cured at 27° C. for 27 days prior to test, while specimens for fire resistance test were cured in steam at 60° C. for 7 days (to accelerate the curing of concrete) prior to drying or curing. Compression tests were carried out at the age of 28 days of concrete using a compression testing machine and the loading rate employed was 0.6 MPa/s. The compressive strength of each sample was the average of results of three specimens. The fire resistance test was conducted by heating concrete specimens in an oven, and the fire resistance of concrete was evaluated in terms of the spalling degree and residual strength. Prior to heating in an oven, for each group, two cube specimens were dried in an oven (105° C.) for one week leading to almost 0% moisture content, while the other two cube specimens were dried in an environmental cabinet (26° C., RH 50%) for two weeks until a moisture content of about 2.6% was reached. The temperature in the oven rose from room temperature to 800° C. in the first 3 hours, and then was maintained at 800° C. for 4 more hours. The specimens in oven were then cooled down naturally and tested in compression.

Table 9 shows the slump and 28 days compressive strength of concrete containing polypropylene fibers. It can be seen that, irrespective of fiber dosage and type, polypropylene fiber addition reduced the slump and strength of concrete. For all five types of fibers, both the slump and strength of concrete were reduced with increasing fiber dosage. The strength reduction of the concrete may be caused by more pores in concrete with lower workability. Regarding the effect of fiber length, it can be seen that increasing the fiber length increased the slump of the concrete, especially when the dosage of fibers is higher, but slightly reduced the strength. The reason may be that, at a specified dosage, the number of fibers added was reduced

TABLE 8

Compositions of concrete containing 0.165 vol % and 0.3 vol % polypropylene fibers (kg/m³)

| PP fiber dosage | Water | Cement | Fly ash | Silica fume | Coarse aggregate (20 mm) | Coarse aggregate (10 mm) | Fine aggregate | Super-plasticizer | PP fiber |
|---|---|---|---|---|---|---|---|---|---|
| 0.165 vol % | 130 | 380 | 145 | 58 | 600 | 400 | 640 | 19 | 1.5 |
| 0.3 vol % | 130 | 380 | 145 | 58 | 600 | 400 | 640 | 19 | 2.73 | with increasing fiber length. However, the cross-sectional shape and fibrillation of polypropylene fiber had almost no effect on the slump and strength of concrete.

TABLE 9

| Slump and 28 days compressive strength of concrete containing polypropylene fibers | | | | | | | | | | | |
|---|---|---|---|---|---|---|---|---|---|---|---|
| Sample | WF7 | F1-L | F1-H | F2-L | F2-H | F3-L | F3-H | F4-L | F4-H | F6-L | F6-H |
| Slump (mm) | 180 | 170 | 160 | 170 | 150 | 170 | 150 | 170 | 140 | 170 | 150 |
| 28 days compressive strength (MPa) | 120 | 109.7 | 108.3 | 115.6 | 108.1 | 115.2 | 108.2 | 115.2 | 113.7 | 114.8 | 110.4 |

The temperatures of the oven and of the center points of concrete without (WF7) and with polypropylene fiber (F3-L and F3-H) were measured by thermocouples. Compared with the oven temperature, the temperature rising of concrete was delayed. This is because time is needed to transfer heat to the center of concrete to cause a temperature rise. It can be seen that when the temperature rose to about 180-200° C., the temperature of concrete increased slowly. This may be caused by the endothermic effect of dehydration (bonded water) of concrete. Moreover, compared to concrete without fiber, there was a time lag in the temperature curves of concrete containing fiber, indicating temperature rising of concrete was delayed when polypropylene fiber was added. This phenomenon was ascribed to the melting of polypropylene fibers and evaporation of moisture. However, the temperature curves of F3-L and F3-H were almost same due to the relatively small amounts of polypropylene fiber (for both 0.165 vol % and 0.3 vol %) compared with concrete materials. As it was expected that the effects of F1, F2, F4 and F6 polypropylene fibers on delaying temperature rising (mainly depending on the melting point and amount of polypropylene fibers) of concrete were similar to F3 polypropylene fiber, the temperature curves of concrete containing F1, F2, F4 and F6 fibers were hence not measured.

Figure 5B:
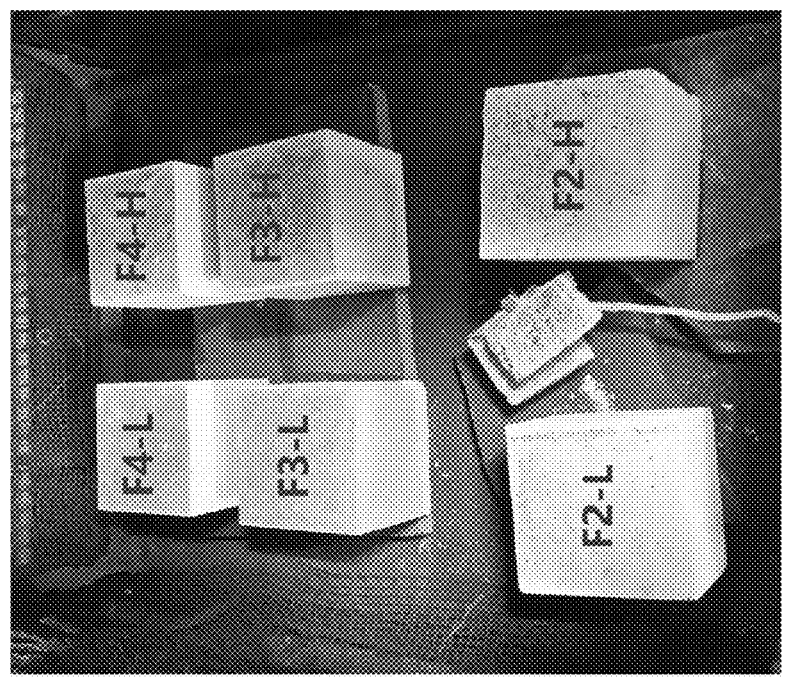
FIG. 5A and FIG. 5B show polypropylene-loaded specimens before and after oven heating, respectively.
Figure 5A:
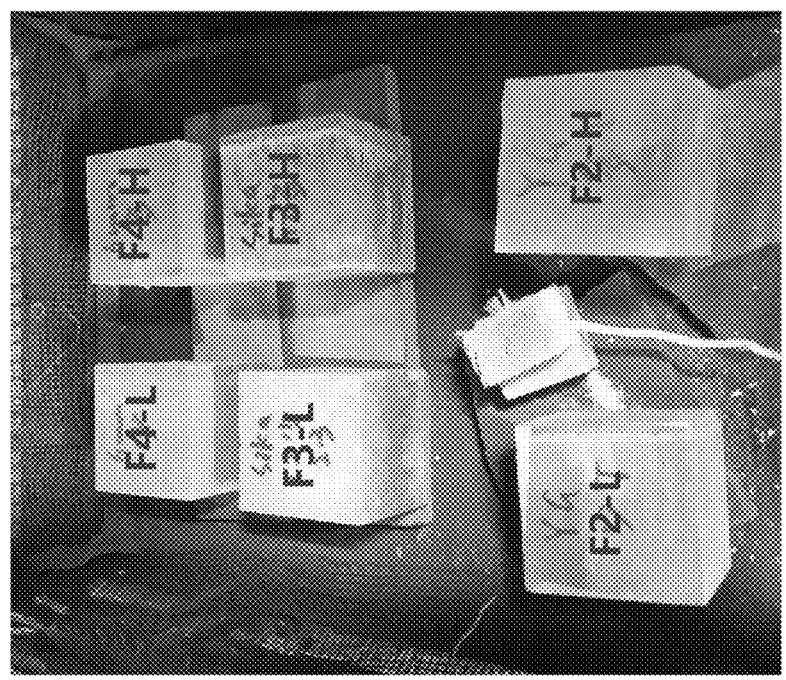

After oven heating, almost no spalling is found in concrete specimens containing polypropylene fibers, irrespective of the moisture content. This phenomenon was also found for the concrete without fiber. As an example, FIGS. 5A and 5B show six specimens before and after oven heating, respectively. Table 10 shows the residual strength of all concrete specimens after oven heating. It can be seen that polypropylene fiber addition did not significantly degrade the strength of concrete. This is because the residual strength degradation of concrete subject to fire resistance testing is mainly caused by the thermal decomposition of hydration products in concrete, while polypropylene fiber has no effect on such decomposition, and the pores in concrete caused by polypropylene fiber thermal decomposition and evaporation would lead to a slight strength degradation. It was concluded that the lower dosage of polypropylene fibers is desirable and does not significantly degrade the fire resistance of the concrete. Concrete with different moisture contents showed similar strength reduction after heating.

TABLE 10

| Residual compressive strength of concrete containing polypropylene fibers | | | | | | | | | | | | |
|---|---|---|---|---|---|---|---|---|---|---|---|---|
| Sample | | WF7 | F1-L | F1-H | F2-L | F2-H | F3-L | F3-H | F4-L | F4-H | F6-L | F6-H |
| 28 days compressive strength (MPa) | | 120 | 109.7 | 108.3 | 115.6 | 108.1 | 115.2 | 108.2 | 115.2 | 113.7 | 114.8 | 110.4 |
| Residual strength (MPa) | 0% moisture content | 29.8 | 30.8 | 27.1 | 29.3 | 24.6 | 27.9 | 29.6 | 28.9 | 26.9 | 28.9 | 29.9 |
| | 2.6% moisture content | 33.4 | 31 | 28 | 28 | 24.5 | 25.7 | 26.9 | 28.5 | 24 | 29.3 | 30.5 |
| Reduction (%) | 0% moisture content | 75 | 72 | 75 | 75 | 77 | 76 | 73 | 75 | 76 | 75 | 73 |
| | 2.6% moisture content | 72 | 72 | 74 | 76 | 77 | 78 | 75 | 75 | 79 | 74 | 72 |

In order to optimize the performance of concrete containing steel fibers, studies were also conducted to investigate the effects of dosage, size and end hooks of steel fiber on the slump, strength, and fire resistance of concrete. To study the effects of fiber dosage, two dosages were employed for each type of steel fiber, 0.2 vol % (15.8 kg/m$^3$) and 0.4 vol % (31.6 kg/m$^3$). The formulation WF7 was employed as the base concrete formulation to prepare concrete containing steel fibers. Eight groups of specimens were prepared, i.e. C0.16-L, C0.16-H, G0.62-3D-L, G0.62-3D-H, G0.92-3D-L, G0.92-3D-H, G0.92-5D-L and G0.92-5D-H, in which C0.16, G0.62-3D, G0.92-3D and G0.92-5D indicated the fiber type, L indicated the lower dosage of 0.2 vol % and H indicated the higher dosage of 0.4 vol %. Table 11 shows the composition of concrete containing 0.2 vol % and 0.4 vol % steel fiber. When preparing concrete containing steel fibers, steel fibers were mixed with the powdery raw materials first and then water and superplasticizer were added followed by continuous mixing to eliminate fiber agglomeration. The specimen number and curing scheme, slump test scheme, compression test scheme and fire resistance test scheme for steel fiber study were substantially similar to those for polypropylene fibers. However, after heating, the residual strengths of concrete cured at 50% RH were not measured.

TABLE 11

Compositions of concrete containing 0.2 vol % and 0.4 vol % steel fibers (kg/m³)

| Steel fiber dosage | Water | Cement | Fly ash | Silica fume | Coarse aggregate (20mm) | Coarse aggregate (10mm) | Fine aggregate | Super-plasticizer | Steel fiber |
|---|---|---|---|---|---|---|---|---|---|
| 0.2 vol % | 130 | 380 | 145 | 58 | 600 | 400 | 640 | 19 | 15.8 |
| 0.4 vol % | 130 | 380 | 145 | 58 | 600 | 400 | 640 | 19 | 31.6 |

The slump and 28 days compressive strength of concrete containing steel fibers were shown in Table 12. It can be seen that, irrespective of the type of steel fibers, the strength of concrete increased while the slump of concrete reduced with increasing fiber dosage. Fiber length has significant effects on the slump of concrete. 13 mm long steel fiber significantly reduced the slump; 30 mm long fiber slightly reduced slump while 60 mm long fiber slightly increased the slump. The reason may be that, at certain dosage, the number of steel fibers reduced with increasing fiber length, hence, the slump is reduced. However, the end hook configuration had almost no effect on the concrete slump. 13 mm long steel microfibers increased the strength, even though the slump reduced; 30 mm or 60 mm long fiber slightly reduced the strength at lower dosage while increased the strength at higher dosage. The concrete containing fibers with 5D end hooks showed higher compressive strength than that of concrete containing 3D end hooks. Strength increase due to steel fiber may be the result of bridging effect of steel fibers (crack opening control) and high tensile strength of the fibers.

Figure 6B:
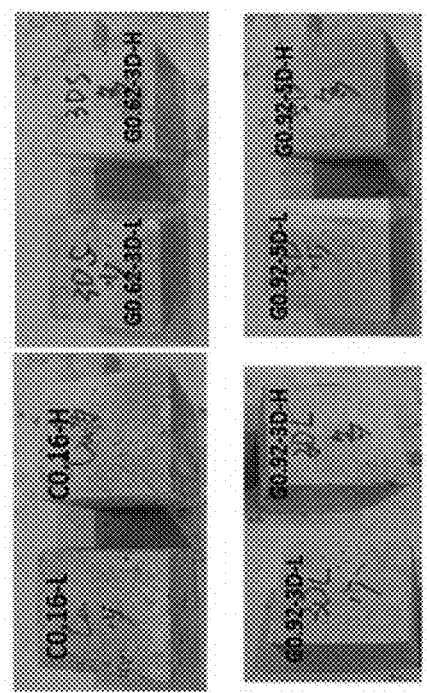
FIGS. 6A and 6B show steel-fiber-loaded HPC specimens before and after oven heating, respectively.
Figure 6A:
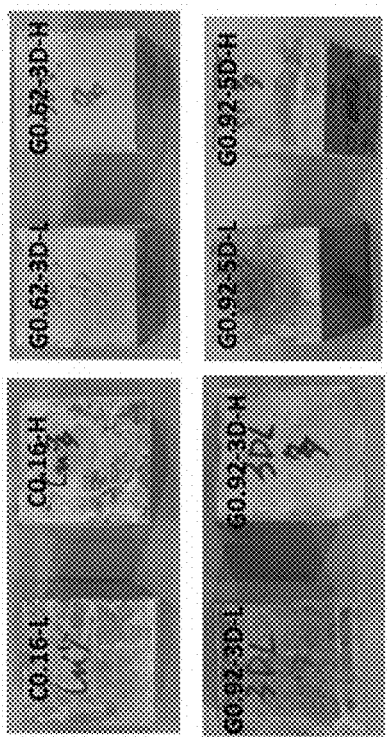

After oven heating, there was almost no spalling in the concrete containing steel fibers (as shown in FIGS. 6A and 6B) irrespective of the moisture content. Table 13 shows the residual strength of all concrete specimens after oven heating. It can be seen that steel fibers increased the strength degradation of concrete. The reason may be that, steel fibers show larger expansion at elevated temperature than concrete, leading to some cracks in concrete. The fiber dosage and type had almost no effect on the residual strength of concrete.

As set forth above, F3 and F4 Sika fiber mesh 150 fibers showed the best compatibility with concrete, and had similar effects on the strength of concrete, but F4 fiber addition would induce more slump reduction compared with F3 fiber. Regarding steel fiber, copper coated steel microfiber showed the highest bonding strength in concrete and most significant effect on increasing the strength of concrete. Consequently, F3, i.e. 12 mm long Sika fiber mesh 150 polypropylene fiber, and C0.16, i.e. 13 mm long copper coated steel microfiber, were selected for use. Fiber loading was determined to be polypropylene fibers in a range of 0.05-0.3 vol % and steel fibers in a range of 0.1-0.4 vol %. Four concrete formulations containing hybrid fibers were developed based on the C100 (WF7) formulation, and their compositions are shown in Table 14.

TABLE 12

Slump and 28 days compressive strength of concrete containing steel fibers

| | WF7 | C0.16-L | C0.16-H | G0.62-3D-L | G0.62-3D-H | G0.62-3D-L | G0.62-3D-H | G0.62-5D-L | G0.92-5D-H |
|---|---|---|---|---|---|---|---|---|---|
| Slump (mm) | 180 | 160 | 140 | 180 | 160 | 200 | 180 | 200 | 180 |
| 28 days compressive strength (MPa) | 120 | 134.4 | 139.4 | 119.2 | 125.7 | 117.2 | 120.1 | 122.9 | 123.8 |

TABLE 13

Residual strength of concrete containing steel fibers (completely dried specimens)

| | WF7 | C0.16-L | C0.16-H | G0.62-3D-L | G0.62-3D-H | G0.62-3D-L | G0.62-3D-H | G0.62-5D-L | G0.92-5D-H |
|---|---|---|---|---|---|---|---|---|---|
| 28 days compressive strength (MPa) | 120 | 134.4 | 139.4 | 119.2 | 125.7 | 117.2 | 120.1 | 122.9 | 123.8 |
| Residual strength (MPa) | 29.8 | 24.5 | 27.6 | 25.8 | 25.6 | 24.5 | 23.7 | 25.3 | 28.2 |
| Reduction (%) | 75 | 82 | 80 | 78 | 80 | 79 | 80 | 79 | 77 |

TABLE 14

Compositions of concrete containing hybrid fibers (kg/m³)

| ID | HF0.083/0.2 | HF0.165/0.1 | HF0.165/0.2 | HF0.165/0.3 |
|---|---|---|---|---|
| Water | 130 | 130 | 130 | 130 |
| Cement | 380 | 380 | 380 | 380 |
| Fly ash | 145 | 145 | 145 | 145 |
| Silica fume | 58 | 58 | 58 | 58 |
| Coarse aggregate (20 mm) | 600 | 600 | 600 | 600 |
| Coarse aggregate (10 mm) | 400 | 400 | 400 | 400 |
| Fine aggregate | 640 | 640 | 640 | 640 |
| Superplasticizer | 19.0 | 19.0 | 19.0 | 19.0 |
| Water binder ratio | 0.223 | 0.223 | 0.223 | 0.223 |
| PP fiber | 0.75 | 1.5 | 1.5 | 1.5 |
| Steel fiber | 15.8 | 7.9 | 15.8 | 23.7 |

Two polypropylene fiber dosages, i.e. 0.083 vol % and 0.165 vol %, and three steel fiber dosages, i.e. 0.1 vol %, 0.2 vol % and 0.3 vol %, were employed. The formulation ID HF0.083/0.2 means the hybrid fiber concrete containing 0.083 vol % polypropylene fibers and 0.2 vol % steel fibers. 6 cubic specimens of 100 mm×100 mm×100 mm were cast for each group. All the specimens were removed from moulds one day after casting, and then wet-cured at 27° C. for 6 days and 27 days prior to test. Compression tests were carried out at the age of 7 days and 28 days with a loading rate of 0.6 MPa/s. The strength of each sample was the average of results of three specimens. The slump and compressive strength of concrete containing hybrid fibers are shown in Table 15.

TABLE 15

Slump and compressive strength of C100 concrete with hybrid fibers

|  | HF0.083/0.2 | HF0.165/0.1 | HF0.165/0.2 | HF0.165/0.3 |
|---|---|---|---|---|
| Slump (mm) | 180 | 190 | 170 | 150 |
| 7-day compressive strength (MPa) | 97.1 | 96.5 | 96.6 | 97.9 |
| 28-day compressive strength (MPa) | 124.5 | 119.4 | 118.8 | 122.7 |

The results further proved that the slump of concrete decreased with increasing fiber content, and steel fibers and polypropylene fibers imposed different effects on the slump and strength of concrete. All four formulations had a slump above 150 mm and a 28-day compressive strength above 113 MPa, i.e. reaching the grade C100 level. The formulations HF0.083/0.2 and HF0.165/0.3 showed better performance in both 7-day and 28-day compressive strength. In consideration of beneficial effect of polypropylene fibers and steel fibers on the fire resistance of concrete, HF0.165/0.3 is adopted as the dosage of fibers for C80, C90 and C100 concrete. C80, C90 concrete including both fibers with a dosage of HF0.165/0.3 were prepared. Their 7-day and 28-day compressive strength is given in Table 16.

TABLE 16

Compressive strength of C80 and C90 concrete containing hybrid fibers

|  | C80 hybrid fibers concrete | C90 hybrid fibers concrete |
|---|---|---|
| 7-day compressive strength (MPa) | 80.7 | 90.0 |
| 28-day compressive strength (MPa) | 98.4 | 111.8 |

Figure 7:
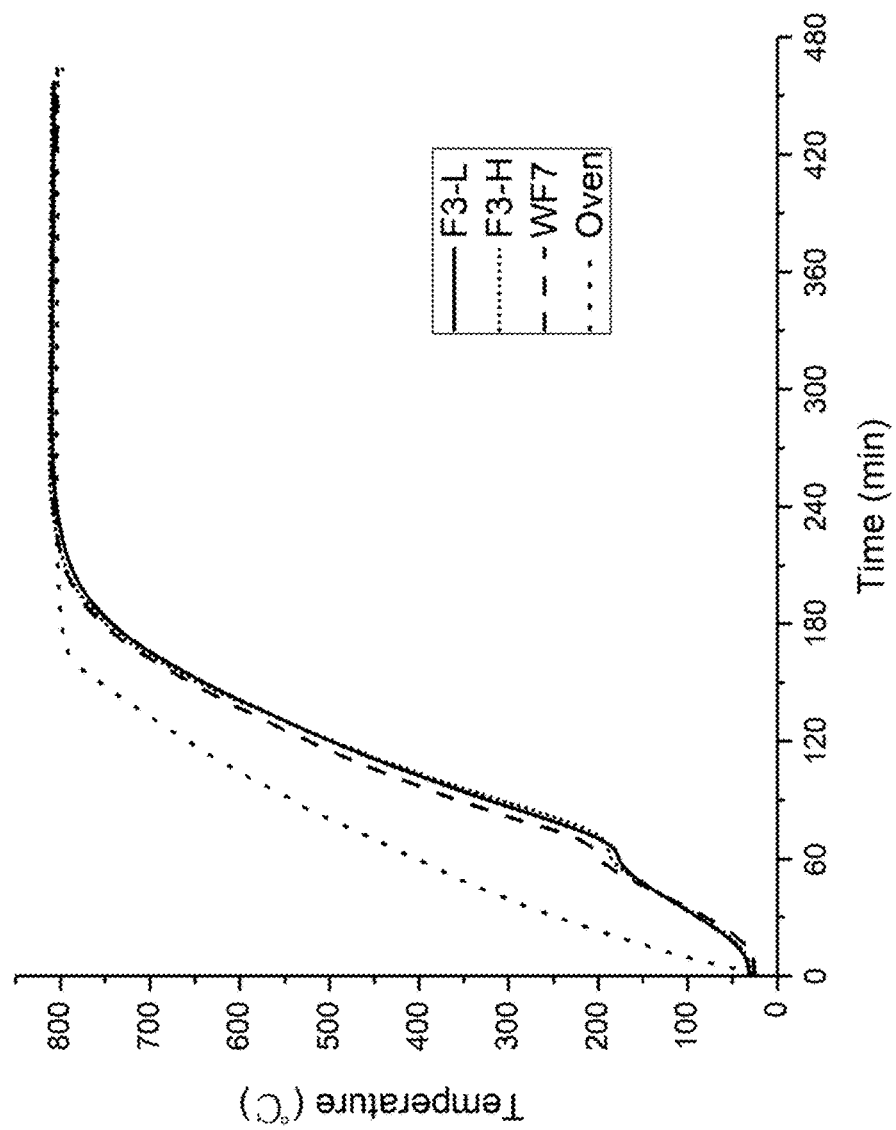
FIG. 7 depicts heating curves for oven-heated specimens.
Figure 8:
FIG. 8 depicts a spalled concrete sample.
Figure 9A:
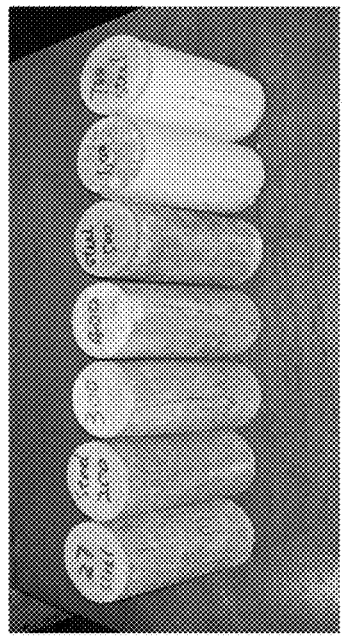
FIGS. 9A, 9B, 9C, and 9D depict physical conditions of HPC specimens following testing.
Figure 9B:
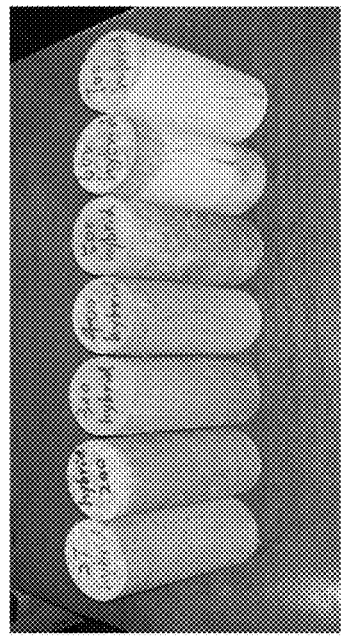
Figure 9C:
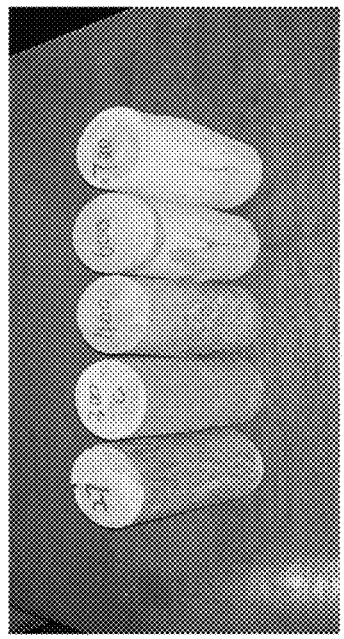
Figure 9D:
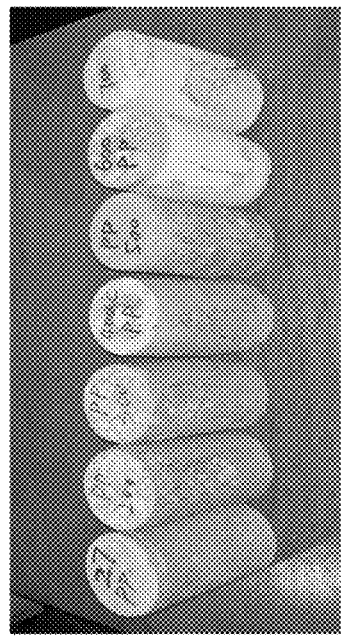

The fire resistance test results of concrete containing steel or polypropylene fibers showed that concrete without moisture (dried at 105° C.) and with 2.6% moisture content had no spalling after being oven heated for 4 hours. For concrete containing PP, steel and hybrid fibers, cubic concrete specimens were immersed in water for 28 days to a saturated condition and then heated. The heating rate is depicted in FIG. 7. All the specimens without fibers irrespective of concrete grade spalled seriously during the heating as shown in FIG. 8. Specimens containing PP, steel and hybrid fibers kept their integrities in the test. This demonstrates the effectiveness of polypropylene and steel fiber in preventing spalling of concrete in fire.

The elastic modulus of C80, C90 and C100 concrete containing and steel fibers with dosage of 0.165 vol % and 0.3 vol % (i.e. HF0.165/0.3) was tested. The results are given in Table 17. The elastic modulus increases with concrete grade. The test values are higher than the recommended values in HK Concrete Code, which demonstrates that the addition of polypropylene and steel fibers does not weaken the elastic modulus of concrete.

TABLE 17

Elastic modulus of C80, C90 and C100 hybrid fibers concrete

| Concrete grade | C80 | C90 | C100 |
|---|---|---|---|
| Elastic modulus (GPa) | 37.9 | 39.7 | 40.7 |
| Recommended elastic modulus in HK Concrete Code (GPa) | 34.2 | 36.0 | 37.8 |

Splitting tensile tests were conducted on C80, C90 and C100 concrete at 28 days according to Hong Kong Construction Standard CS1-2010. Specimens used for splitting tests were cylinders with diameters of 100 mm and heights of 200 mm. In addition, compression tests on C100 HPC at elevated temperatures was conducted to evaluate the effect of steel fibers and PP fibers on fire resistance of HPC. Specimens with various fiber types were prepared (Table 18). Cylindrical specimens with a diameter of 75 mm and a height of 150 mm were cast. The specimens were removed from the moulds 24 hours after casting, and were wet-cured at 27° C. for 28 days. The temperatures considered in this test include room temperature, 200° C., 300° C., 400° C., 500° C., 600° C. and 700° C. A pair of specimens was tested at each temperature to determine the mechanical properties.

TABLE 18

Mix proportion of C100 HPC

| Group | Control | Steel fiber | PP fiber | Hybrid fiber |
|---|---|---|---|---|
| Water | 130 | 130 | 130 | 130 |
| Cement | 380 | 380 | 380 | 380 |

TABLE 18-continued

Mix proportion of C100 HPC

| Group | Control | Steel fiber | PP fiber | Hybrid fiber |
|---|---|---|---|---|
| Fly ash | 145 | 145 | 145 | 145 |
| Silica fume | 58 | 58 | 58 | 58 |
| Coarse aggregate (20 mm) | 600 | 600 | 600 | 600 |
| Coarse aggregate (10 mm) | 400 | 400 | 400 | 400 |
| Crushed stone | 256 | 256 | 256 | 256 |
| River sand | 384 | 384 | 384 | 384 |
| Superplasticizer | 15.5 | 15.5 | 15.5 | 15.5 |
| PP fiber | — | — | 1.5 | 1.5 |
| Steel fiber | — | 23.7 | — | 23.7 |

The compressive strength of the specimens were tested at room temperature, 200° C., 300° C., 400° C., 500° C., 600° C. and 700° C. They were heated inside the electric furnace at a constant heating rate of 5° C./min without preloading to attain the specified temperature. After achieving a hold-period of three hours, loading was applied to the specimens inside the electric furnace by an MTS hydraulic testing machine of 4600 kN loading capacity.

The splitting strength of the inventive compositions is given in Table 19. The addition of polypropylene and steel fibers greatly improves the splitting strength of the concrete. Following the addition of 0.165 vol % of polypropylene fibers and 0.3% of steel fibers, C80, C90 and C100 concrete increased their splitting strength by 25.9%, 18.9%, and 12.4%, respectively. The lower the concrete grade is, the more the splitting strength increases. Both polypropylene fiber and steel fiber contribute to the increase in splitting tensile strength of concrete. In the fiber dosage range adopted in the present invention, a greater dosage of polypropylene or steel fibers is beneficial to the improvement on tensile performance of concrete.

TABLE 19

Splitting strength of HPC

| Concrete grade | C80 | | C90 | | C100 | | | | |
|---|---|---|---|---|---|---|---|---|---|
| Fiber dosage | None | HF 0.165/ 0.3 | None | HF 0.165/ 0.3 | None | HF 0.083/ 0.2 | HF 0.165/ 0.1 | HF 0.165/ 0.2 | HF 0.165/ 0.3 |
| Splitting strength (MPa) | 5.29 | 6.66 | 5.70 | 6.78 | 6.11 | 6.42 | 6.43 | 6.75 | 6.87 |

Figure 10:
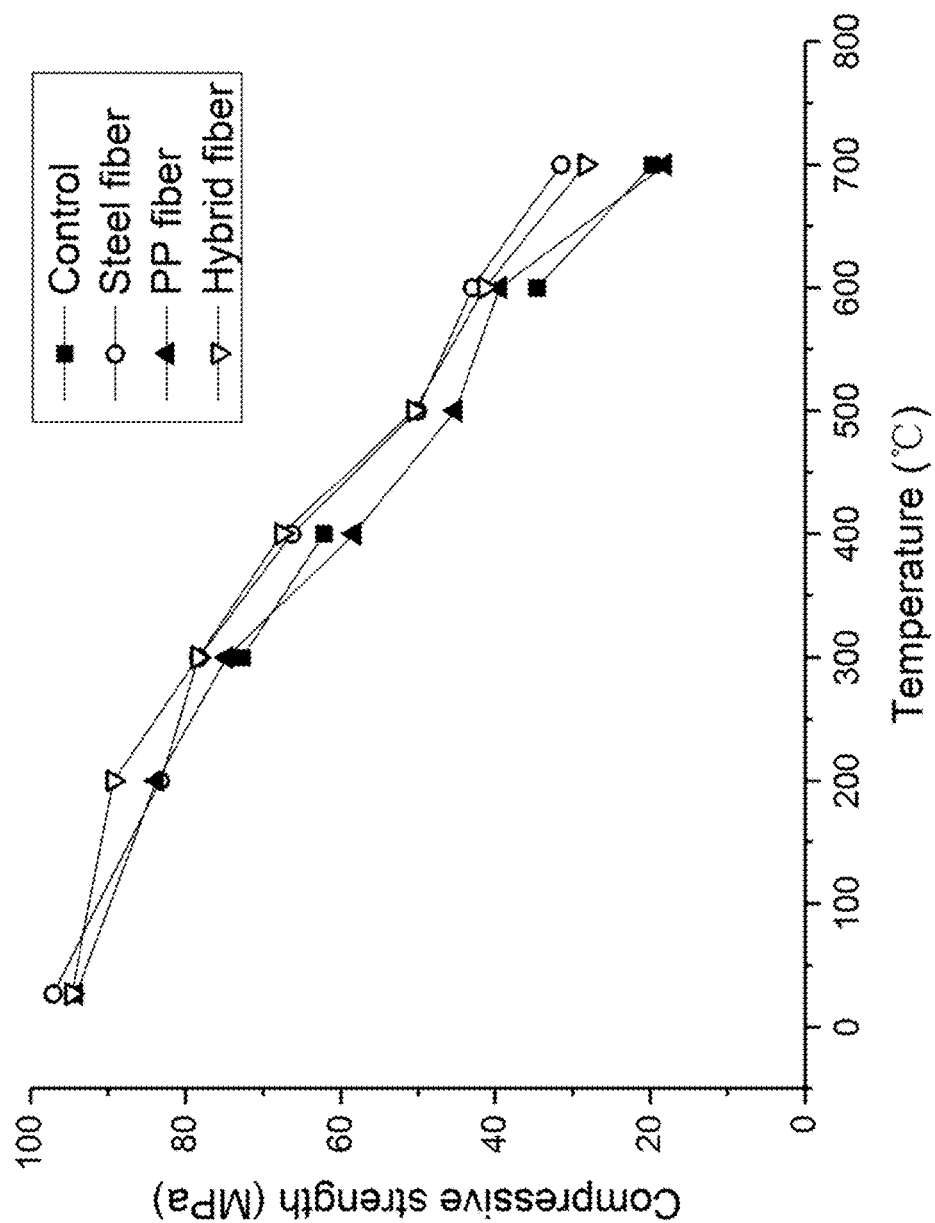
FIG. 10 depicts the compressive strength of specimens at different temperatures.

FIGS. 9A-9D show the physical conditions of specimens after test. As the temperature the specimens were exposed to increased, the color of the specimens changed from dark grey to light grey. The groups containing steel fibers and hybrid fibers were damaged slightly more than the other two groups. The compressive strength of specimens at different temperatures is shown in FIG. 10. For all groups, there is a decline in compressive strength with increasing temperatures. The compressive strength of the control concrete drops to 21% of that at room temperature when the temperature increases to 700° C. Steel fibers show a positive effect on improving the compressive strength of concrete under high temperature. The improvement becomes increasingly prominent with increasing temperatures. Steel fibers enhance the loading capacity of concrete by 60% at 700° C. However, polypropylene fibers exert little influence on the compressive strength. This is because steel fibers can retain their strength at elevated temperatures, while polypropylene fibers melt completely above 400° C.

To further enhance the fire resistance and workability of the present high performance concrete, nanoparticles were mixed into concrete compositions to evaluate their influence on strength and thermal conductivity of HPC. Grade C100 HPC developed above was adopted as a control formula. Solid nano $Mg(OH)_2$, polyphenylsilsesquioxane ("POSS"), carbon nanotube ("CNT"), and nano $SiO_2$ slurries were considered as the nanoparticle additions. The dosage of nanoparticles is approximately 0.1% to 0.3% of the volume of the concrete. Solid nano $Mg(OH)_2$, POSS and CNT were dispersed into a slurry by an ultrasonic mixture before use. Two different dispersion methods were used. Method A is dispersing nanoparticles and water with mass ratio of 1:11.4 for 4 hours by 30% of rated power. Method B is dispersing nanoparticles, water and superplasticizer with a mass ratio of 1:11.4:1 for 0.5 hour by 70% of rated power (Table 20). The specimens were removed from the moulds 24 hours after casting, and were wet-cured at 27° C. for 28 days or steam-cured at 60° C. for 7 days. After curing, 6 specimens were subjected to compression tests for each group. The other specimens were heated in an electric furnace. A thermocouple was embedded in a concrete cube with a dimension of 100*100*100 mm. The temperature at the centroid of the cube and furnace was measured. The heating rate was 5° C./min and the holding period was 4 hours. All specimens remain intact after test. The residual compressive strength of specimens was also tested.

TABLE 20

High performance concrete containing nanoparticles

| Group | Material | Nano particle dosage | Fiber dosage | Dispersion method |
|---|---|---|---|---|
| Control | Grade C100 concrete | — | — | — |
| POSS | Grade C100 concrete + POSS | 0.5% of binder mass | | Method A |
| $Mg(OH)_2$ | Grade C100 concrete + Mg(OH)2 | | | |
| CNT1 | Grade C100 concrete + CNT | | | |
| CNT2 | Grade C100 concrete + CNT | | | Method B |
| $SiO_2$ | Grade C100 concrete + SiO2 slurry | | | — |
| Hybrid | Grade C100 concrete + polypropylene fiber + steel fiber | — | PP: 0.22 vol %, Steel: 0.3 vol % | — |

Figure 11:
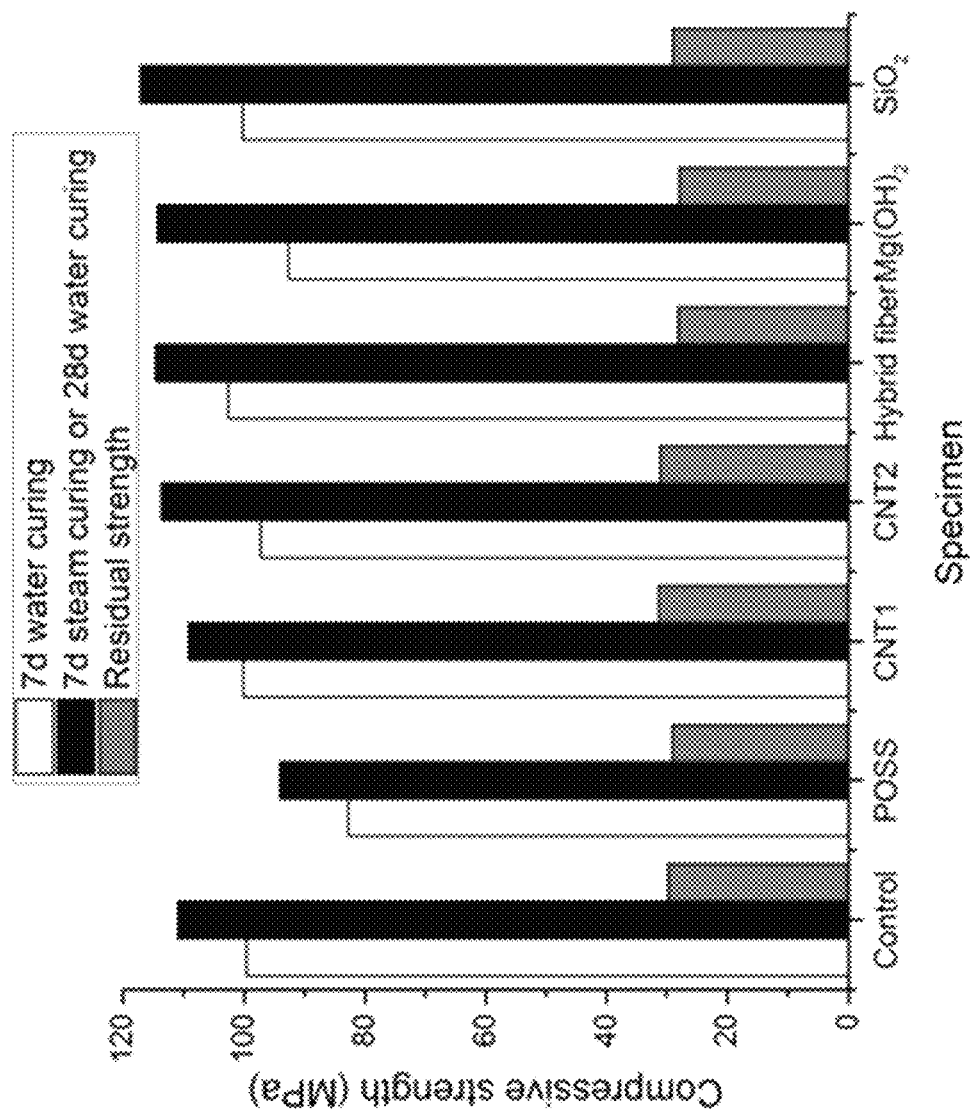
FIG. 11 depicts compressive strength and residual strength of various specimens after water curing, steam curing.
Figure 12:
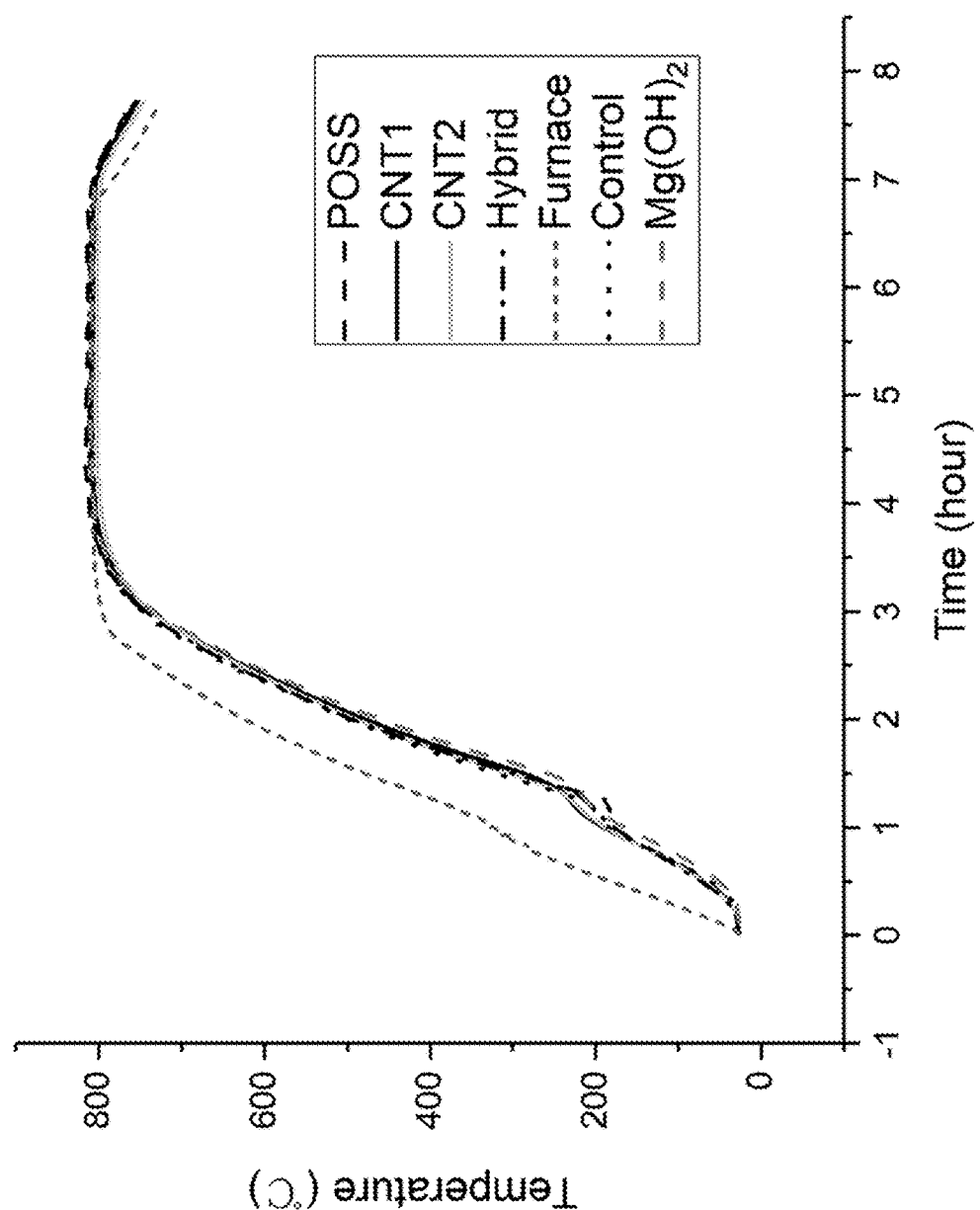
FIG. 12 depicts temperature vs. time for various samples comprising nanoparticles.

The compressive strength and temperature inside the concrete including nanoparticles are shown in FIGS. 11 and 12. POSS impeded the development of concrete strength and carbon nanoparticles are the only materials to survive the high-temperature environment; therefore, carbon nanotubes are selected as additives to the high performance concrete composition.

Fire tests were conducted in an accredited laboratory to verify the fire resistance of the concrete compositions of the present invention according to international standards. As high strength concrete is mainly used in vertical elements (such as columns, walls, etc.) in practical applications, fire tests were conducted on column specimens.

Twelve short HPC columns varying in mix proportions, dimensions and cover thickness were prepared. The short columns had two cross-section dimensions, 250 mm×250 mm×1000 mm and 400 mm×400 mm×1000 mm. The thickness of concrete cover (from surface of specimen to stirrups) was 30 mm for the former, and 30 mm or 45 mm for the latter (Table 21). Here, C80HF-CS250-30 indicates the column made of C80 hybrid fibers-containing concrete with cross section of 250 mm×250 mm and cover thickness of 30 mm. C100C and C100CNT indicate C100 control concrete (without fiber) and C100 hybrid fibers-containing concrete with CNT dosage of 0.13 vol %, respectively. The difference between "HF" and "HF2" is that polypropylene dosage is 0.165 vol % in the former while 0.22 vol % in the latter. Fire tests on short concrete column specimens without loading were conducted in a horizontal furnace in Research Engineering Development Facade Consultants Limited. The fire tests lasted four hours according to BS EN 1363-1.

TABLE 21

Details of HPC columns for fire test

| No | Specimen ID | Concrete grade | Cross section | Length | Cover thickness | Additive (with respect to the volume of concrete) |
|---|---|---|---|---|---|---|
| 1 | C80HF-CS250-30 | C80 | 250 mm × 250 mm | 1000 mm | 30 mm | 0.165 vol % polypropylene fiber and 0.3 vol % steel fiber |
| 2 | C90HF-CS250-30 | C90 | | | 30 mm | |
| 3 | C100HF-CS250-30 | C100 | | | 30 mm | |
| 4 | C80HF-CS400-30 | C80 | 400 mm × 400 mm | | 30 mm | |
| 5 | C80HF-CS400-45 | | | | 45 mm | |
| 6 | C90HF-CS400-30 | C90 | | | 30 mm | |
| 7 | C90HF-C5400-45 | | | | 45 mm | |
| 8 | C100HF-C5400-30 | C100 | | | 30 mm | |
| 9 | C100HF-C5400-45 | | | | 45 mm | |
| 10 | C100C-CS400-45 | | | | 45 mm | None |
| 11 | C100HF2-CS400-45 | | | | | 0.22 vol % polypropylene fiber and 0.3 vol % steel fiber |
| 12 | C100CNT-C5400-45 | | | | | 0.165 vol % 0.3 vol % steel fiber and 0.13 vol% CNT |

Figure 13A:
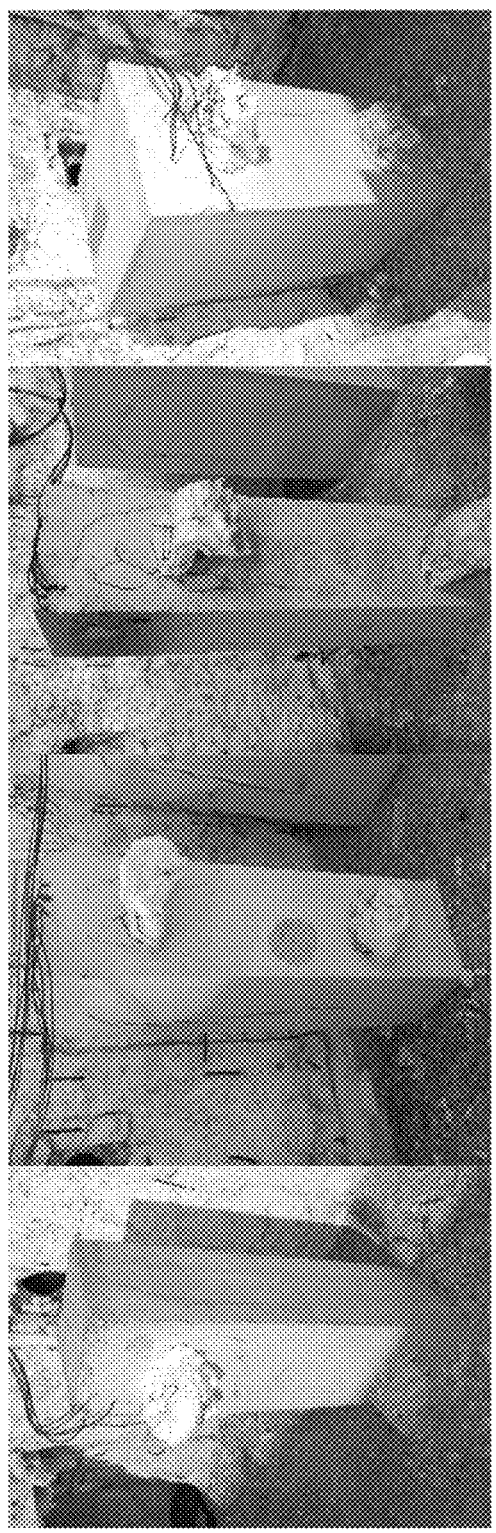
FIGS. 13A, 13B, and 13C depict the short concrete column specimens following a fire test.
Figure 13B:
Figure 13C:
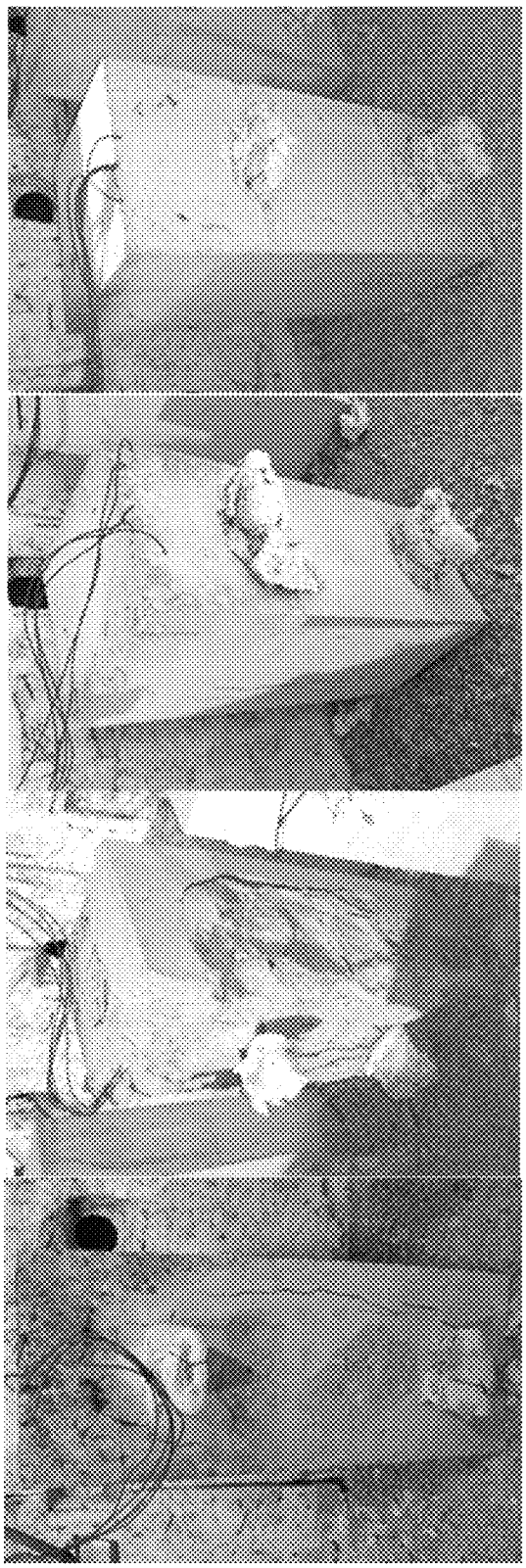
Figures 14A, 14B:
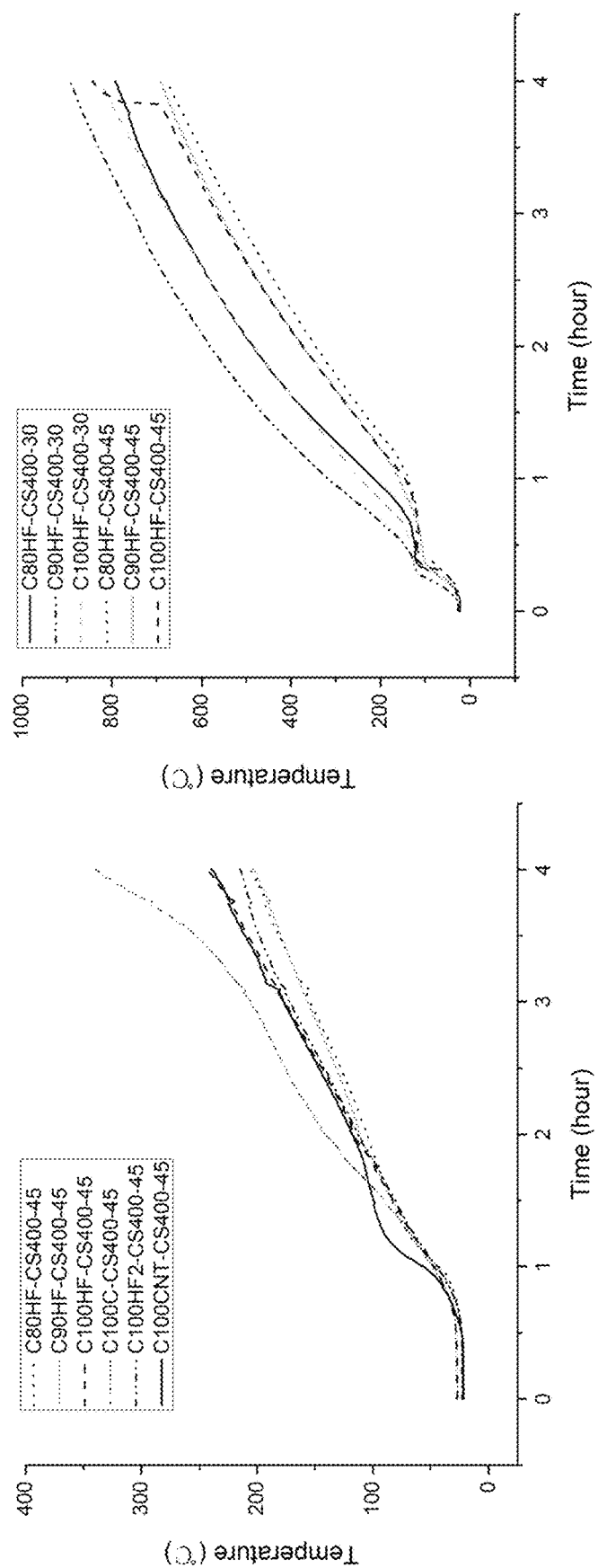
FIGS. 14A, 14B, and 14C depict temperature inside short concrete column specimens vs. time during a fire test.
Figure 14C:
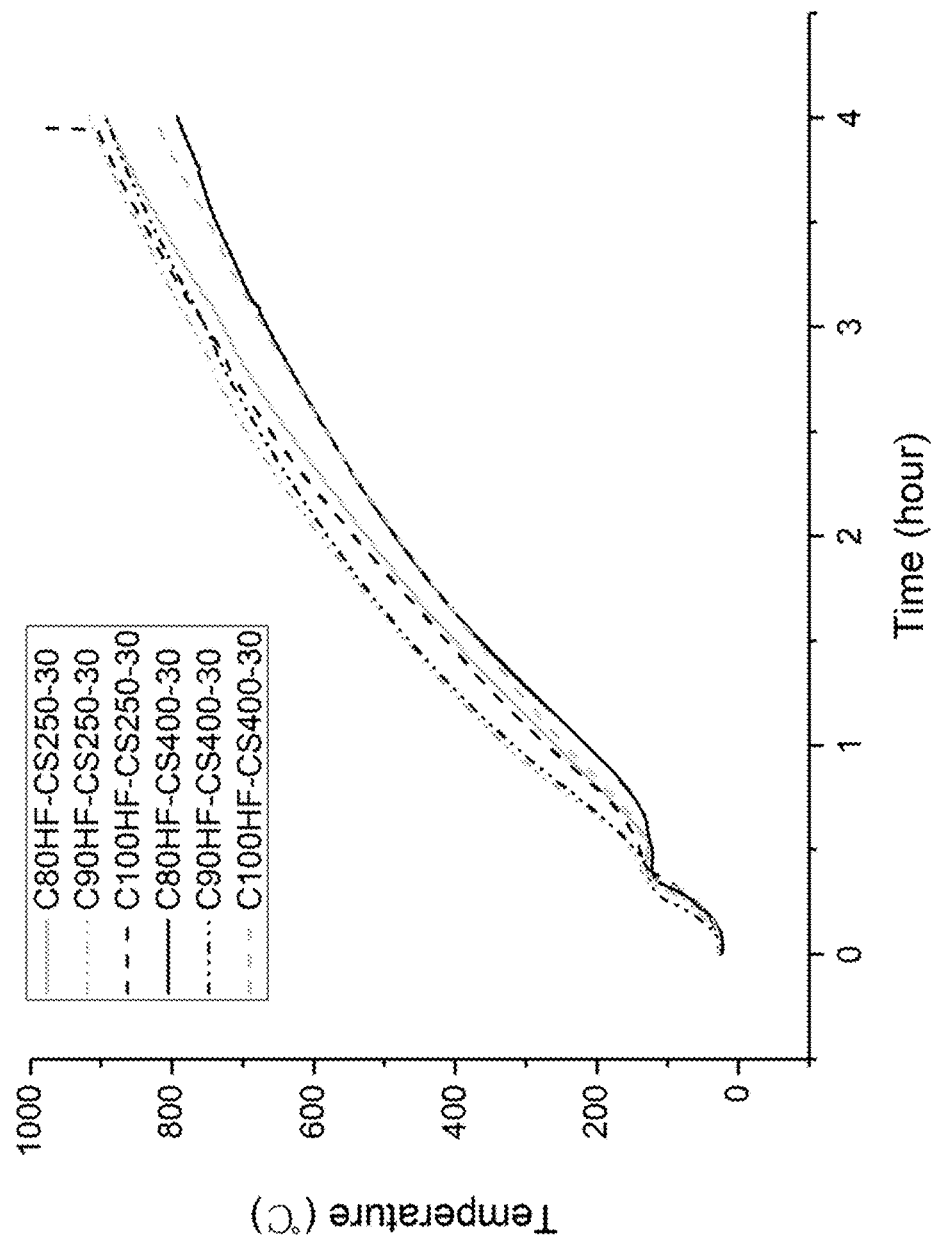

Specimens after the fire test are shown in FIGS. 13A-13C. It can be seen C100C-CS400-45 concrete column spalled severely and exposed its reinforcements. The spalling weakened the cross section of the column and raised the temperature at the centroid of the control specimen (FIG. 14A). In contrast, the specimens containing polypropylene and steel fibers kept their integrity during the fire test, which demonstrates that the addition of polypropylene and steel fibers can effectively improve the fire resistance of high performance concrete. As shown in FIG. 14A, C100 concrete has higher thermal conductivity than C80 and C90 concrete due to its denser structure. The addition of carbon nanotubes improved the thermal conductivity of the concrete. The effect of cover thickness and cross section on temperature of reinforcement are shown in FIGS. 14B and 14C. Thick concrete cover contributes to hinder the transmission of heat. Large cross sections can absorb more heat and thus reduce the temperature of reinforcements. Depth and area ratio (the ratio of spalled area to original area) of spalled concrete is given in Table 22. The risk of spalling increases with concrete grade. Among the C100 concrete specimens, C100HF2-CS400-45 with 0.22 vol % of polypropylene fibers and 0.3 vol % of steel fibers possessed the best structural integrity. Its mix proportion was used to prepare a long HPC column for fire test with loading.

TABLE 22

Depth and area ratio of spalled concrete in short columns

| No | Specimen ID | Depth of spalled cover (mm) | Ratio of spalled area to original area |
|---|---|---|---|
| 1 | C80HF-CS250-30 | 0 | 0 |
| 2 | C90HF-CS250-30 | 8.2 | 1% |
| 3 | C100HF-CS250-30 | 11.4 | 7% |
| 4 | C80HF-CS400-30 | 0 | 0 |
| 5 | C80HF-CS400-45 | 0 | 0 |
| 6 | C90HF-CS400-30 | 0 | 0 |
| 7 | C90HF-CS400-45 | 6.8 | 0.65% |
| 8 | C100HF-CS400-30 | 9.4 | 9.20% |
| 9 | C100HF-CS400-45 | 8.5 | 4.28% |
| 10 | C100C-CS400-45 | 55 | 90% |
| 11 | C100HF2-CS400-45 | 6 | 1.10% |
| 12 | C100CNT-CS400-45 | 14.5 | 6% |

Fire testing with axial loading was performed on a full-scale HPC column to test its fire resistance. For this test, one long HPC column with dimensions of 400 mm wide by 400 mm deep by 3300 mm high and cover thickness of 45 mm was prepared. Reinforcements of the specimen consisted of eight main reinforcements with a diameter of 20 mm and eighteen stirrups with diameter of 10 mm. The spacing of stirrups was 200 mm in the middle part, and 150 mm at both ends of the specimen. Nine thermocouples were installed on the main reinforcements and at the center of cross section of the specimen before concrete casting. The concrete composition is given in Table 23. Measured 28-day compressive strength of the concrete was 122 MPa. Thickness of concrete cover was 45 mm from surface of specimen to stirrups.

TABLE 23

| Mix proportion of C100N HPC (kg/m³) | |
|---|---|
| Water | 130 |
| Cement | 380 |
| PFA | 145 |
| Silica fume | 58 |
| Coarse aggregate (20 mm) | 700 |
| Coarse aggregate (10 mm) | 230 |
| Fine aggregate (Sand) | 440 |
| Fine aggregate (crushed stone) | 300 |
| Superplasticizer ADVA189 | 28.7 |
| PP fiber | 2 |
| Steel fiber | 23.7 |

The fire test on the long concrete column specimens was conducted in a vertical furnace in Research Engineering Development Facade Consultants Limited. Vertical loading of 400 kN was applied on the top of specimen by two hydraulic jacks. The eccentricity of the loading was 6 mm. According to BS EN 1363-1, the temperature of furnace follows the relationship, $T = 345 \log_{10}(8t+1) + 20$ Here, T is the average furnace temperature and t is the time in minutes. The fire tests lasted 241 minutes.

Figure 15B:
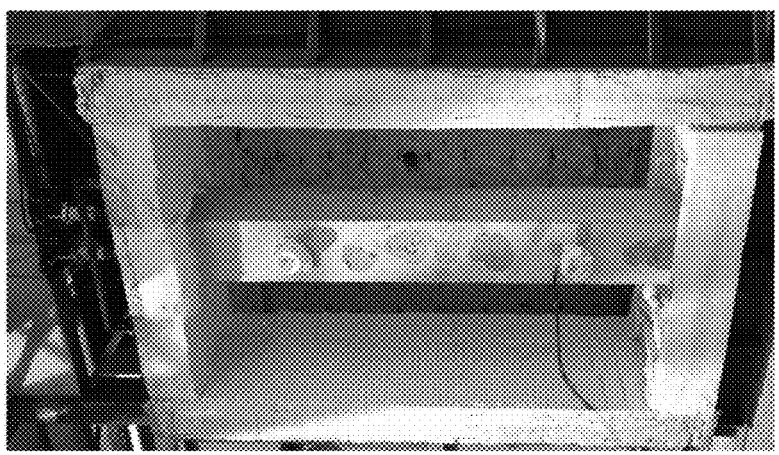
FIGS. 15A and 15B depict the long concrete column specimens after the fire test.
Figure 15A:
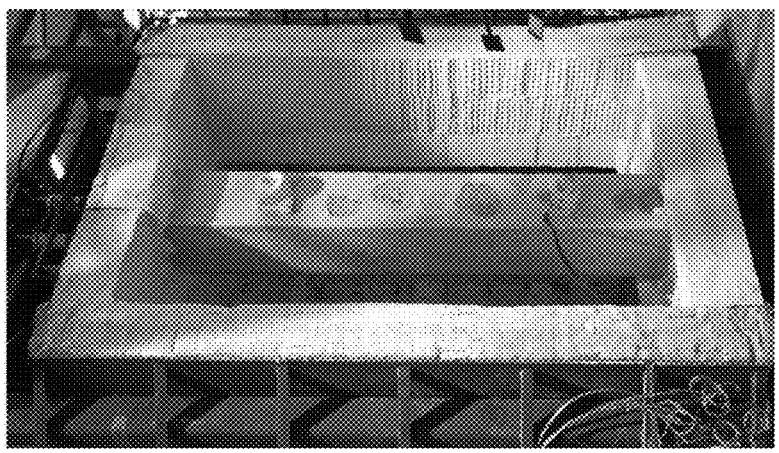

The long column specimen kept its integrity generally after fire test except for some slight spalling of the concrete cover at its front (FIGS. 15A and 15B). The spalling can be explained by the fact that when the column was cast horizontally, the heavier aggregate sank, while the lighter paste and water floated and gather on the surface of the column. The excessive water content in the surface layer of the column led to the spalling in fire. However, the depths of all spalled concrete did not exceed 11 mm, which is much less than the thickness of concrete cover, 45 mm. The slight spalling will have little effect on the temperature inside the column.

Figure 16:
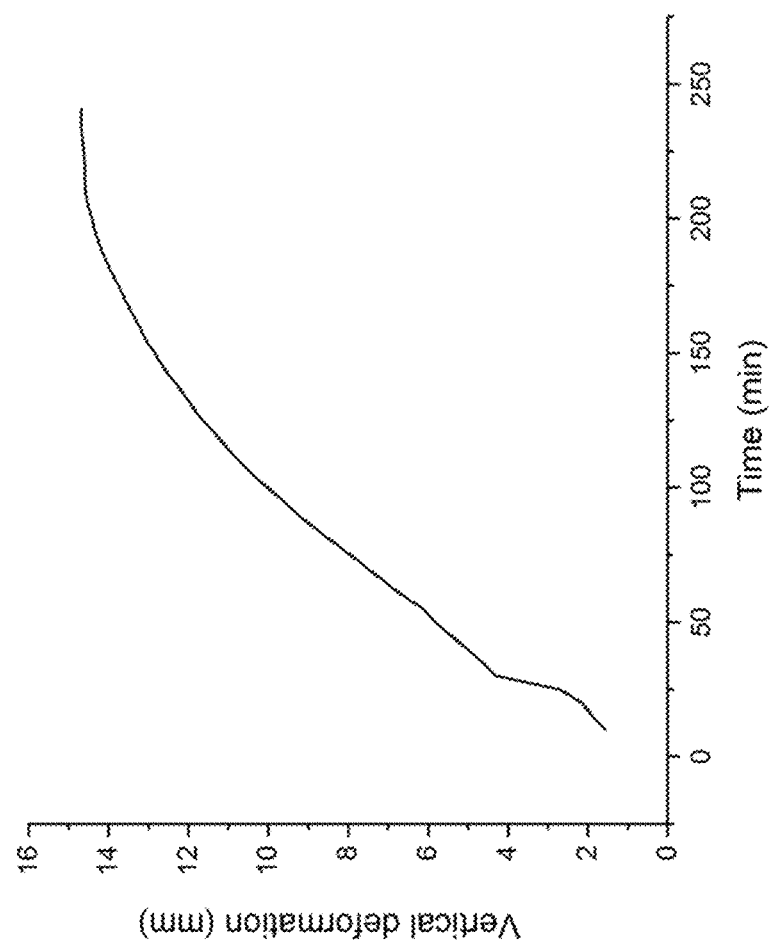
FIG. 16 depicts vertical deformation of the long column vs. time.
Figure 17:
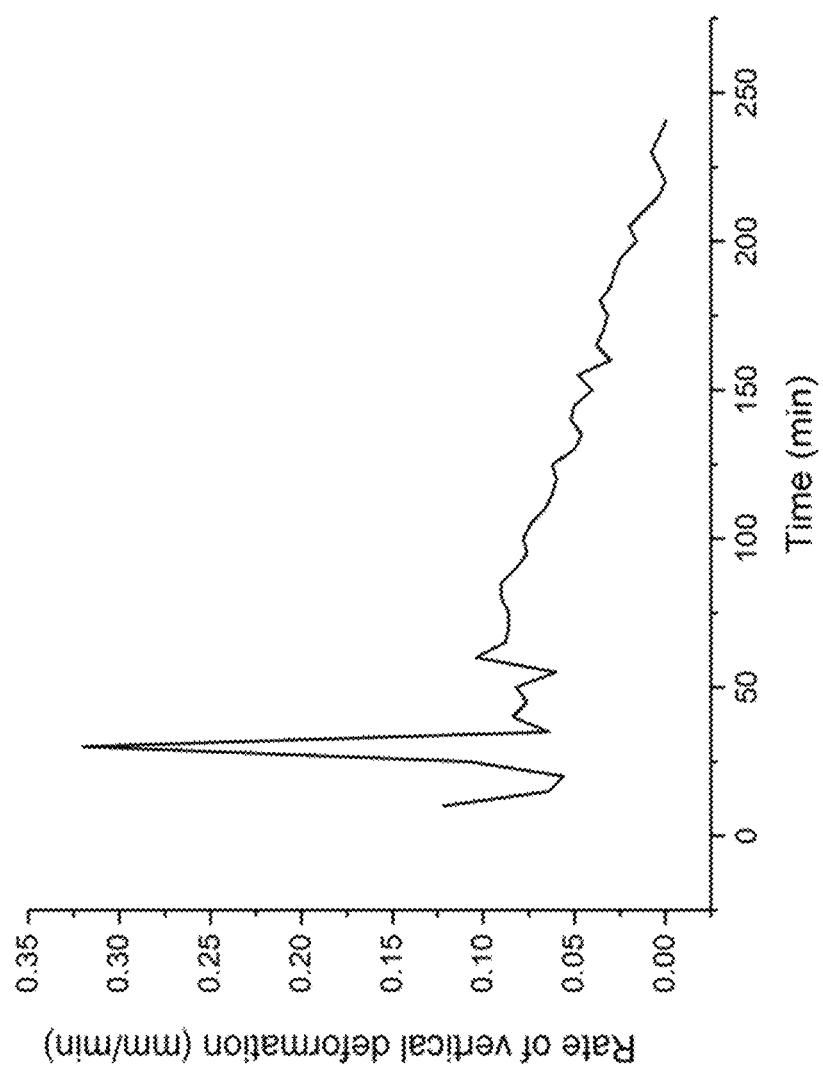
FIG. 17 depicts the vertical deformation rate of the long column vs. time.

Vertical deformation and deformation rate of the long column are shown in FIGS. 16 and 17. Although subject to compression of 400 kN, the column exhibited positive elongation during the whole fire test. According to BS EN 1363-1, for vertically loaded elements, when their vertical contraction (negative elongation) reaches 1% of their initial height, or their rate of vertical contraction (negative elongation) reaches 0.3% of their initial height, the elements will be identified to lose their loading capacity in a fire test. Because the long HPC column maintained continuous expansion (i.e. positive elongation), it maintained its ability to support the test load during the test and passed the fire test.

The thermal parameters of the concrete compositions of the present invention were tested. HPC slabs with dimensions of 300 mm×300 mm×75 mm and four HPC prisms with dimensions of 70 mm×70 mm×285 mm were prepared for thermal conduction and thermal expansion tests, respectively.

The prisms for thermal expansion test were first heated in an electric furnace to 40° C., 60° C., 80° C., and 100° C. respectively and maintained for half an hour. The prisms were then removed from the furnace and their length was measured immediately by a length comparator. The coefficient of linear expansion $\alpha_l$ was obtained by the following equation, $$\alpha_l = \frac{CRD_T - CRD_i}{G(T - T_i)}$$

Here, $CRD_i$ and $CRD_T$ are difference between the comparator reading of the specimen and the reference bar under initial temperature and temperature T, respectively; G is the gage length, 250 mm; $T_i$ is initial temperature, 25° C.

Figure 18:
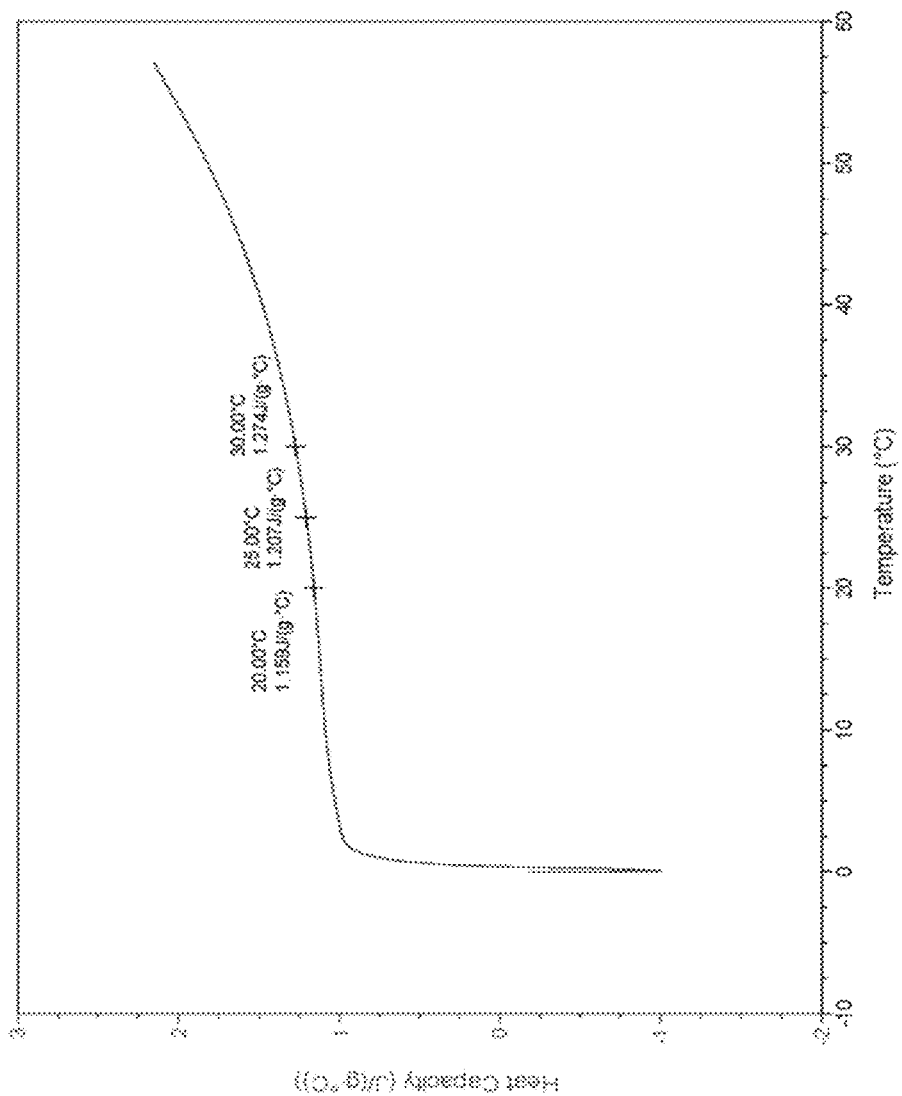
FIG. 18 shows the specific heat capacity of a binder paste of HPC.

A binder paste specimen of the HPC was prepared by grinding in a ball mill. The specific heat capacity of the binder paste was then tested by differential scanning calorimetry and shown in FIG. 18. Harmathy established a formula to calculate the specific heat capacity of concrete as follows:

$$c_c = \omega_{pt} c_{pt} + \omega_{fa} c_{fa} + \omega_{ca} c_{ca}$$

Here, $c_{pt}$, $c_{fa}$, and $c_{ca}$ are specific heat of cement paste, fine aggregate, and coarse aggregate, respectively. $\omega_{pt}$, $\omega_{fa}$, and $\omega_{ca}$ are mass fraction of cement paste, fine aggregate, and coarse aggregate in concrete, respectively. Harmathy's formula was modified to calculate the specific heat capacity of the HPC containing steel and polypropylene fibers as follow.

$$c_c = \omega_p c_p + \omega_{sa} c_{sa} + \omega_{st} c_{st} + \omega_{sf} c_{sf} + \omega_{pf} c_{pf}$$

Here, $c_p$, $c_{sa}$, $c_{st}$, $c_{sf}$ and $c_{pf}$ are specific heat of binder paste, sand, stone, steel fiber and polypropylene fiber at 25° C., respectively. $c_p$ is 1.207 J/(g° C.) according to test results shown in FIG. 18. $c_{sa}$, $c_{st}$, $c_{sf}$ and $c_{pf}$ are 0.92, 0.82, 0.469, 1.68 J/(g° C.), respectively [2-4]. $\omega_{pt}$, $\omega_{sa}$, $\omega_{st}$, $\omega_{sf}$ and $\omega_{pf}$ are mass fraction of binder paste, sand, stone, steel fiber and polypropylene fiber in HPC, respectively.

Calculated specific heat capacity of HPC is 0.953 J/(g° C.). Coefficient of heat conduction and coefficient of thermal expansion of HPC are given in Tables 24 and 25.

TABLE 2

Coefficient of heat conduction of HPC (W/mK)

| Measuring point | A | B | C | D | E | Average |
|---|---|---|---|---|---|---|
| Specimen 1 | 2.4546 | 2.4658 | 2.6682 | 2.3914 | 2.2181 | 2.4396 |
| Specimen 2 | 2.3347 | 2.4811 | 2.6649 | 2.6475 | 2.7123 | 2.5681 |
| Specimen 3 | 2.4861 | 2.8969 | 2.2158 | 2.7493 | 2.8877 | 2.6472 |
| Average | | | | | | 2.5516 |

TABLE 25

Coefficient of thermal expansion of HPC (× $10^{-6}$/° C.)

| Temperature (° C.) | 40 | 60 | 80 | 100 |
|---|---|---|---|---|
| Specimen 1 | 9.600 | 9.370 | 9.450 | 9.230 |
| Specimen 2 | 9.600 | 9.490 | 9.820 | 9.760 |
| Specimen 3 | 9.867 | 9.710 | 9.890 | 9.710 |
| Specimen 4 | 8.267 | 9.370 | 9.670 | 9.490 |
| Average | 9.333 | 9.490 | 9.710 | 9.550 |

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

The invention claimed is:

1. A high-workability, fire-resistant, anti-spalling concrete composition having a slump value of at least approximately 150 mm, a fire-resistant period of at least 4 hours, a compressive strength of at least 120 MPa at room temperature, and a compressive strength of at least 20 MPa at 700° C., the composition comprising:
   cement;
   fly ash;
   silica fume;
   aggregate particles having a particle size $D_{90}$ of approximately 20 mm or less; and
   superplasticizer;
the composition including fiber additives comprising steel fibers in an amount ranging between approximately 0.1% and approximately 0.4% by volume of the concrete composition and polypropylene fibers having a melting point of approximately 200° C. or less in an amount ranging between approximately 0.05% and 0.3% by volume of the concrete composition and further comprising carbon nanoparticles in an amount ranging between approximately 0.1% and 0.3% by volume of the concrete composition.

2. The concrete composition of claim 1, wherein the compressive strength at 700° C. is at least 28 MPa.

3. The concrete composition of claim 1, wherein steel fiber is coated with copper.

4. The concrete composition of claim 1 wherein the water contact angle of the polypropylene fiber is less than 90 degrees.

5. The concrete composition of claim 1, wherein the carbon nanoparticles are carbon nanotube.

6. The concrete composition of claim 1, wherein the carbon nanoparticles are dispersed in a slurry.

7. The concrete composition of claim 1, wherein the polypropylene fibers have an average length greater than approximately 6 mm.

8. The concrete composition of claim 1, wherein the polypropylene fibers have a diameter less than approximately 42 microns.

9. The concrete composition of claim 1, wherein the steel fibers have an average length greater than approximately 13 mm.

10. The concrete composition of claim 1, wherein the steel fibers have a diameter of at least approximately 160 microns.

11. The concrete composition of claim 1, wherein the superplasticizer is a polycarboxylate-based superplasticizer.

* * * * *